(12) United States Patent
Murata et al.

(10) Patent No.: US 11,139,730 B2
(45) Date of Patent: Oct. 5, 2021

(54) BURST CONTROLLER AND BURST CONTROL METHOD OF RESONANCE CONVERTER

(71) Applicant: FUJI ELECTRIC CO., LTD., Kawasaki (JP)

(72) Inventors: Koji Murata, Suzuka (JP); Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/778,191

(22) Filed: Jan. 31, 2020

(65) Prior Publication Data

US 2020/0169176 A1 May 28, 2020

Related U.S. Application Data

(63) Continuation of application No. PCT/JP2018/043669, filed on Nov. 28, 2018.

(30) Foreign Application Priority Data

Feb. 8, 2018 (JP) .............................. JP2018-020630

(51) Int. Cl.
*H02M 1/00* (2006.01)
*H02M 3/335* (2006.01)

(52) U.S. Cl.
CPC ..... *H02M 1/0035* (2021.05); *H02M 3/33569* (2013.01); *H02M 1/00* (2013.01)

(58) Field of Classification Search
CPC . H02M 2001/0032; H02M 2001/0035; H02M 7/4811; H02M 7/4815; H02M 7/4826
See application file for complete search history.

(56) References Cited

U.S. PATENT DOCUMENTS 7,944,716 B2    5/2011  Halberstadt
9,276,480 B2    3/2016  Feng et al.
(Continued)

FOREIGN PATENT DOCUMENTS

EP    2469696 A1    6/2012
JP    2008535456 A  8/2008
(Continued)

OTHER PUBLICATIONS

International Search Report for PCT/JP2018/043669, dated Feb. 19, 2019.
Written Opinion for PCT/JP2018/043669, dated Feb. 19, 2019.

*Primary Examiner* — Alex Torres-Rivera
*Assistant Examiner* — David A. Singh
(74) *Attorney, Agent, or Firm* — Rabin & Berdo, P.C.

(57) ABSTRACT

A switching period in a burst cycle includes three pulses, that is to say, a start pulse that turns on a low-side switching element, a main pulse that turns on a high-side switching element, and an end pulse that turns on the low-side switching element. A burst stop period corresponding to the magnitude of a load is set during a switching stop period. When the burst cycle approaches a cycle corresponding to a frequency close to the upper limit of the audible frequencies, a second off-threshold voltage of the main pulse is made equal to a first off-threshold voltage of the start pulse to narrow the on-width of the main pulse. By doing so, energy transmitted to the secondary side of a transformer is reduced and the burst cycle is shortened.

25 Claims, 18 Drawing Sheets

(56) References Cited

U.S. PATENT DOCUMENTS

| | | | |
|---|---|---|---|
| 9,979,308 B1* | 5/2018 | Meneses Herrera | ........................ H02M 3/33592 |
| 2010/0020573 A1* | 1/2010 | Melanson | ............... H01F 38/02 363/41 |
| 2010/0208499 A1 | 8/2010 | Halberstadt | |
| 2011/0002145 A1 | 1/2011 | Halberstadt | |
| 2012/0163039 A1 | 6/2012 | Halberstadt | |
| 2016/0164425 A1 | 6/2016 | Chen | |

FOREIGN PATENT DOCUMENTS

| | | | |
|---|---|---|---|
| JP | 2016111758 A | 6/2016 | |
| WO | 2009004582 A1 | 1/2009 | |
| WO | 2009098640 A1 | 8/2009 | |

\* cited by examiner

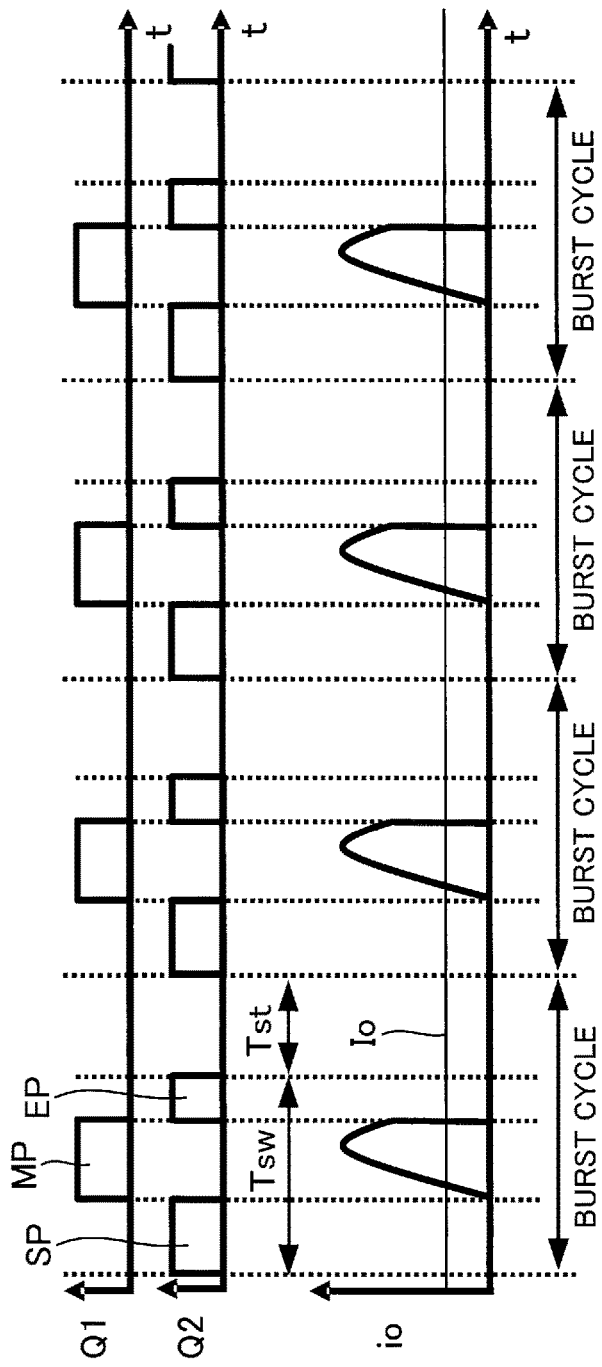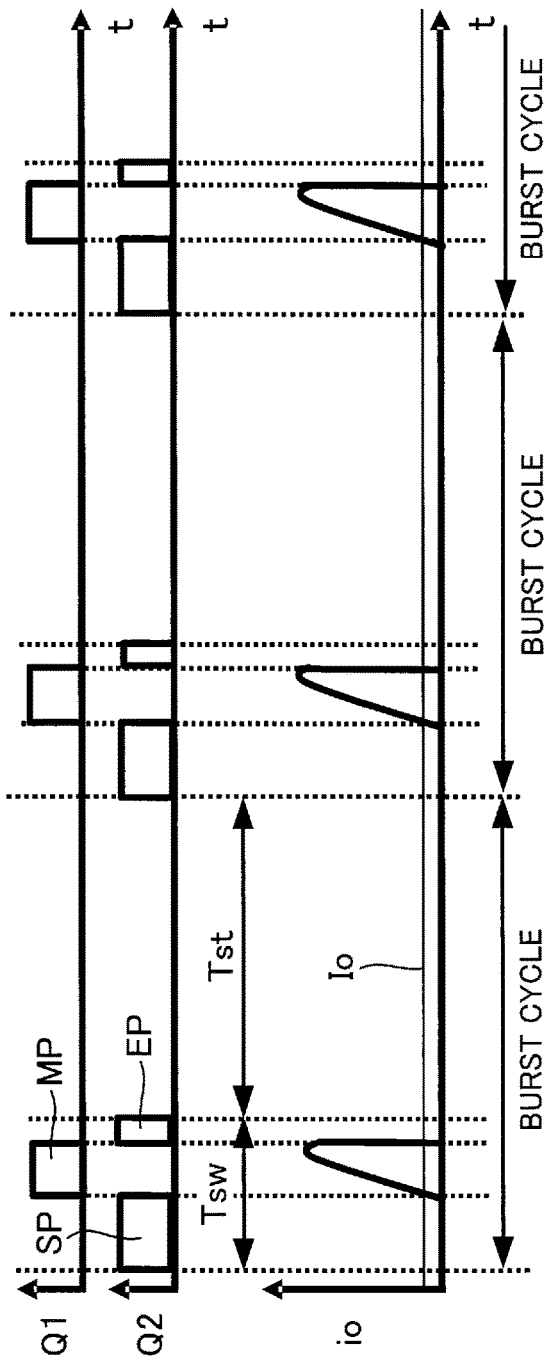
FIG. 3A
FIG. 3B

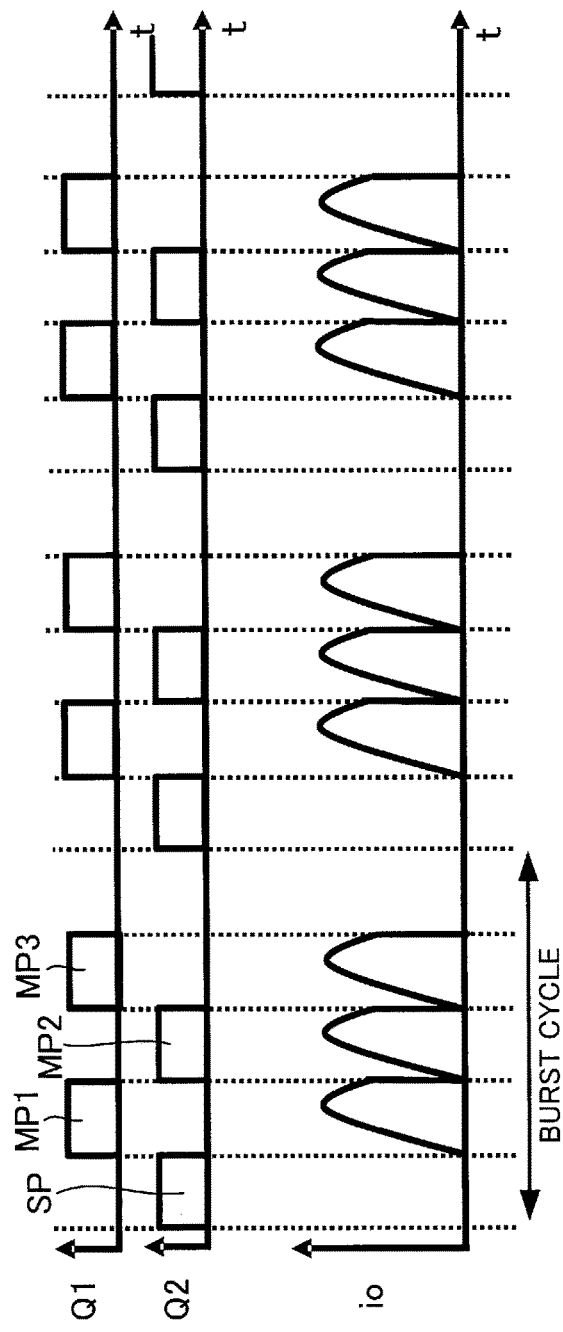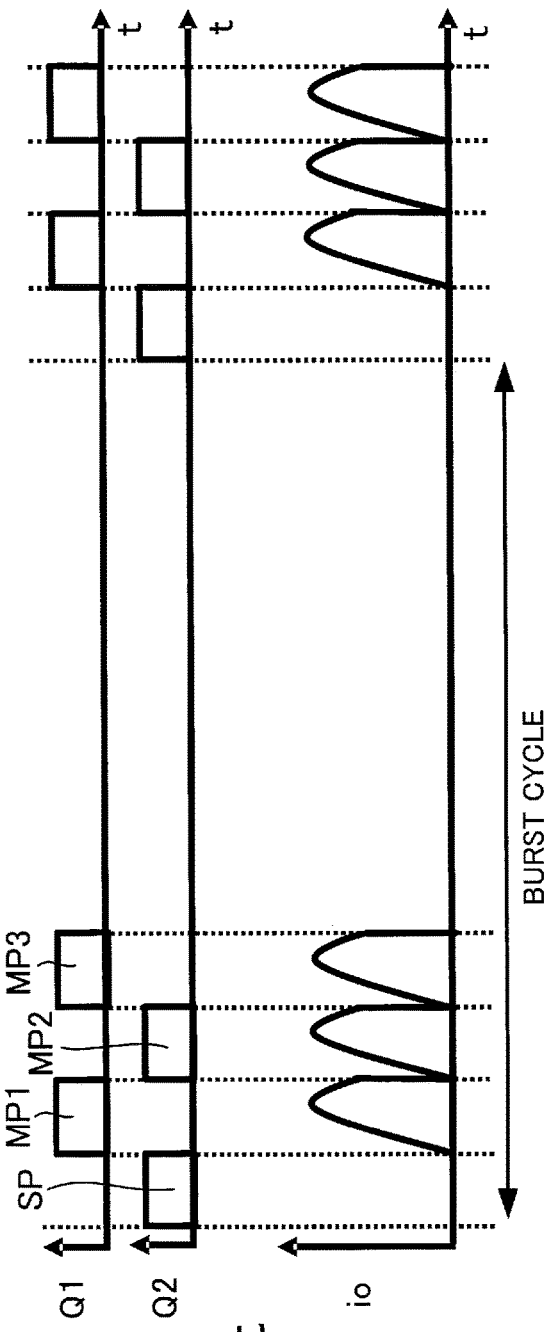
FIG. 18A Related Art
FIG. 18B Related Art

BURST CONTROLLER AND BURST CONTROL METHOD OF RESONANCE CONVERTER

CROSS-REFERENCE TO RELATED APPLICATION

This application is a continuation application of International Application PCT/JP2018/043669 filed on Nov. 28, 2018 which designated the U.S., which claims priority to Japanese Patent Application No. 2018-020630, filed on Feb. 8, 2018, the entire contents of which are incorporated herein by reference.

BACKGROUND OF THE INVENTION

1. Field of the Invention

The embodiment discussed herein is related to burst control of a resonance converter which shifts from continuous control to intermittent control when a load becomes lighter.

2. Background of the Related Art

Because current resonance DC-DC switching converters are suitable for increasing efficiency or reducing thickness, they are widely adopted in power supply adapters for televisions and the like. With such resonance converters control is exercised so that an output voltage supplied to a load will be constant. Furthermore, with resonance converters output power is controlled according to the magnitude of a load.

With control of an LLC resonance converter, for example, a duty cycle of switching is set to 50%. At light load time (in a standby mode, for example) a duty cycle is decreased to suppress output power (see, for example, Japanese National Publication of International Patent Application No. 2008-535456). In this case, resonance operation is not stopped but continued.

On the other hand, burst control in which switching operation is intermittently stopped at light load time is known (see, for example, U.S. Pat. No. 9,276,480). According to the technique disclosed in U.S. Pat. No. 9,276,480, for example, at normal continuous control time an LLC resonance converter does not stop but continuously performs switching operation. At light load time the LLC resonance converter exercises burst control. In this burst control, a switching period including a plurality of switching cycles and a switching stop period for which switching operation is not performed alternate. The LLC resonance converter which exercises the burst control will now be described.

FIG. 16 illustrates an example of the fundamental structure of a resonance converter. FIG. 17 illustrates a change in current flowing during a switching period. FIGS. 18A and 18B illustrate a change in load current in burst control. FIG. 18A illustrates a change in load current at heavy load time. FIG. 18B illustrates a change in load current at light load time.

As illustrated in FIG. 16, a resonance converter has a half-bridge circuit including a high-side switching element Q1 and a low-side switching element Q2 connected is series. In the example of FIG. 16, n-channel metal-oxide-semiconductor field-effect transistors (MOSFETs) are used as the switching elements Q1 and Q2. A drain terminal of the switching element Q1 is connected to a positive electrode terminal of an input voltage Vi and a source terminal of the switching element Q2 is connected to a negative electrode terminal of the input voltage Vi.

The common connection point of the switching elements Q1 and Q2 is connected to one end of a resonance inductor Lr and the other end of the resonance inductor Lr is connected to one end of an excitation inductor Lm of a transformer T. The other end of the excitation inductor Lm is connected to one end of a resonance capacitor Cr and the other end of the resonance capacitor Cr is connected to the source terminal of the switching element Q2 and the negative electrode terminal of the input voltage Vi. The resonance inductor Lr, the excitation inductor Lm, and the resonance capacitor Cr are connected is series. By doing so, they make up a resonance circuit of current resonance type. Leakage inductance of the transformer T may be used as the resonance inductor Lr.

One end of a secondary winding S1 of the transformer T is connected to a cathode terminal of a diode D1 and one end of a secondary winding S2 of the transformer T is connected to a cathode terminal of a diode D2. The other ends of the secondary windings S1 and S2 are connected to a positive electrode terminal of an output capacitor Co and one terminal of a load Ro. Anode terminals of the diodes D1 and D2 are connected to a negative electrode terminal of the output capacitor Co and the other terminal of the load Ro. The secondary windings S1 and S2, the diodes D1 and D2, and the output capacitor Co make up an output circuit which rectifies and smooths an alternating voltage generated in the secondary windings S1 and S2 and which outputs a direct-current output voltage Vo.

With the above resonance converter the switching elements Q1 and Q2 are turned on alternately in normal continuous control. When the high-side switching element Q1 is turned on, energy supplied from the input voltage Vi is transmitted to the secondary side of the transformer T. When the low-side switching element Q2 is turned on, energy stored in the resonance capacitor Cr is transmitted to the secondary side of the transformer T. At this time a current flowing during a switching period is determined by an initial value of the voltage of the resonance capacitor Cr and an initial value of a resonant current icr.

On the other hand, a switching period and a switching stop period exist in burst control. In the example of FIG. 17, one start pulse SP and a plurality of (three, in this example) main pulses MP1, MP2, and MP3 are generated in a switching period. The start pulse SP indicates the beginning of the switching period. The switching element Q1 passes a resonant current icr by the main pulse MP1 during the first portion of the switching period. At this time a current io1 flows as a secondary-side current io on the secondary side of the transformer T. The switching element Q2 passes a primary-side resonant current (−icr) by the main pulse MP2 during the second portion of the switching period. At this time a current io2 flows as the secondary-side current io on the secondary side of the transformer T. The switching element Q1 passes a resonant current icr by the main pulse MP3 during the third portion of the switching period. At this time a current io3 flows as the secondary-side current io on the secondary side of the transformer T. As a result, a load current Io obtained by averaging the currents io1 through io3 flows through the load Ro.

A switching stop period follows the switching period. Energy transmitted to the secondary side of the transformer T is reduced by setting the switching stop period. The length of the switching stop period is controlled according to the magnitude of the load Ro.

With the burst control a current flowing during the switching period is determined by an initial value of the voltage of the resonance capacitor Cr and an initial value of the resonant current icr. This is the same with the continuous control. With the burst control, however, a current flowing by the start pulse SP is determined by a residual voltage of the resonance capacitor Cr (=voltage of the resonance capacitor Cr during the switching stop period) and an initial value (approximately equal to 0) of the resonant current icr.

However, before the start pulse SP goes into an on state, the residual voltage of the resonance capacitor Cr is not high. Therefore, while the start pulse SP is in the on state, usually a current does not flow on the secondary side. As a result, a current which flows when the first main pulse MP1 goes into an on state is determined by the residual voltage of the resonance capacitor Cr and the initial value of the resonant current icr. In the example of FIG. 17, a case where a small secondary-side current io flows when the first main pulse MP1 goes into an on state, a case where a large secondary-side current io flows when the first main pulse MP1 goes into an on state, and a case where a moderate secondary-side current io flows when the first main pulse MP1 goes into an on state are illustrated in that order from the left. If the secondary-side current io is small, the width of the last main pulse in the preceding burst cycle is too small and a residual voltage of the resonance capacitor Cr or an initial value of the resonant current icr is not sufficient. Conversely, if the secondary-side current io is large, the width of the last main pulse in the preceding burst cycle is too large and a residual voltage of the resonance capacitor Cr and an initial value of the resonant current icr are high.

As stated above, if the secondary-side current io which flows when the first main pulse MP1 goes into an on state is too small or too large, the efficiency of the resonance converter falls. Therefore, the width of the last main pulse in the preceding burst cycle is adjusted. By doing so, a residual voltage of the resonance capacitor Cr becomes moderate and the secondary-side current io which flows when the first main pulse MP1 goes into an on state is properly controlled in the next burst cycle. As a result, the efficiency of the resonance converter becomes optimum.

Operation performed when the resonance converter makes the transition from continuous control to burst control will now be described. To begin with, just after the load current Io supplied to the load Ro decreases and the burst control is begun, a switching stop period in a burst cycle is short as illustrated in FIG. 18A. Because at this time the switching stop period is short, energy transmitted to the secondary side of the transformer T is reduced a little. The value of the secondary-side current io corresponds to the magnitude of a load.

If the load becomes lighter, then a switching stop period in a burst cycle becomes longer as illustrated in FIG. 18B. As a result, the burst cycle becomes longer. As a switching stop period in a burst cycle becomes longer, energy transmitted to the secondary side of the transformer T is reduced more. Control is exercised so that the value of the secondary-side current io will correspond to the magnitude of the load. The efficiency of the resonance converter becomes optimum.

With the resonance converter a switching frequency is set to a value sufficiently higher than audible frequencies. However, if a burst cycle becomes longer in the burst control, then the burst cycle lengthens to a cycle (50 μs) corresponding to the upper limit (20 kHz) of the audible frequencies. As a result, a sound is produced.

SUMMARY

According to an aspect, there is provided a burst controller of a resonance converter, the resonance converter including a high-side switching element and a low-side switching element, and operating the high-side and low-side switching elements with a burst cycle having a burst frequency after a first timing at which a load of the resonance converter becomes smaller than a first load threshold, the burst cycle including a switching period during which the high-side switching element and the low-side switching element are respectively and repeatedly turned on and off, and a switching stop period during which the high-side switching element and the low-side switching element are both turned off. The burst controller includes: a load detection circuit which detects a magnitude of the load; and an on-pulse generation circuit which generates, during the switching period in the burst cycle, a start pulse that turns on the low-side switching element, a main pulse that turns on the high-side switching element, and an end pulse that turns on the low-side switching element, wherein the on-pulse generation circuit changes an on-width of the main pulse from a first on-width to a second on-width smaller than the first on-width at a second timing obtained from the magnitude of the load detected by the load detection circuit, the second timing being a timing at which the load becomes smaller than a second load threshold smaller than the first load threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIGS. 3A and 3B illustrate a change in burst cycle, FIG. 3A illustrating a state in which a load is heavy in burst control, FIG. 3B illustrating a state in which the load is light in the burst control;

FIGS. 18A and 18B illustrate a change in load current in the burst control, FIG. 18A illustrating a change in load current at heavy load time, FIG. 18B illustrating a change in load current at light load time.

DETAILED DESCRIPTION OF THE INVENTION

An embodiment will now be described in detail with reference to the accompanying drawings. Components in figures indicated by the same numerals are the same. Furthermore, in the following description the same numeral may be used for representing the name of a terminal and a voltage, a signal, or the like at the terminal.

Figure 1:
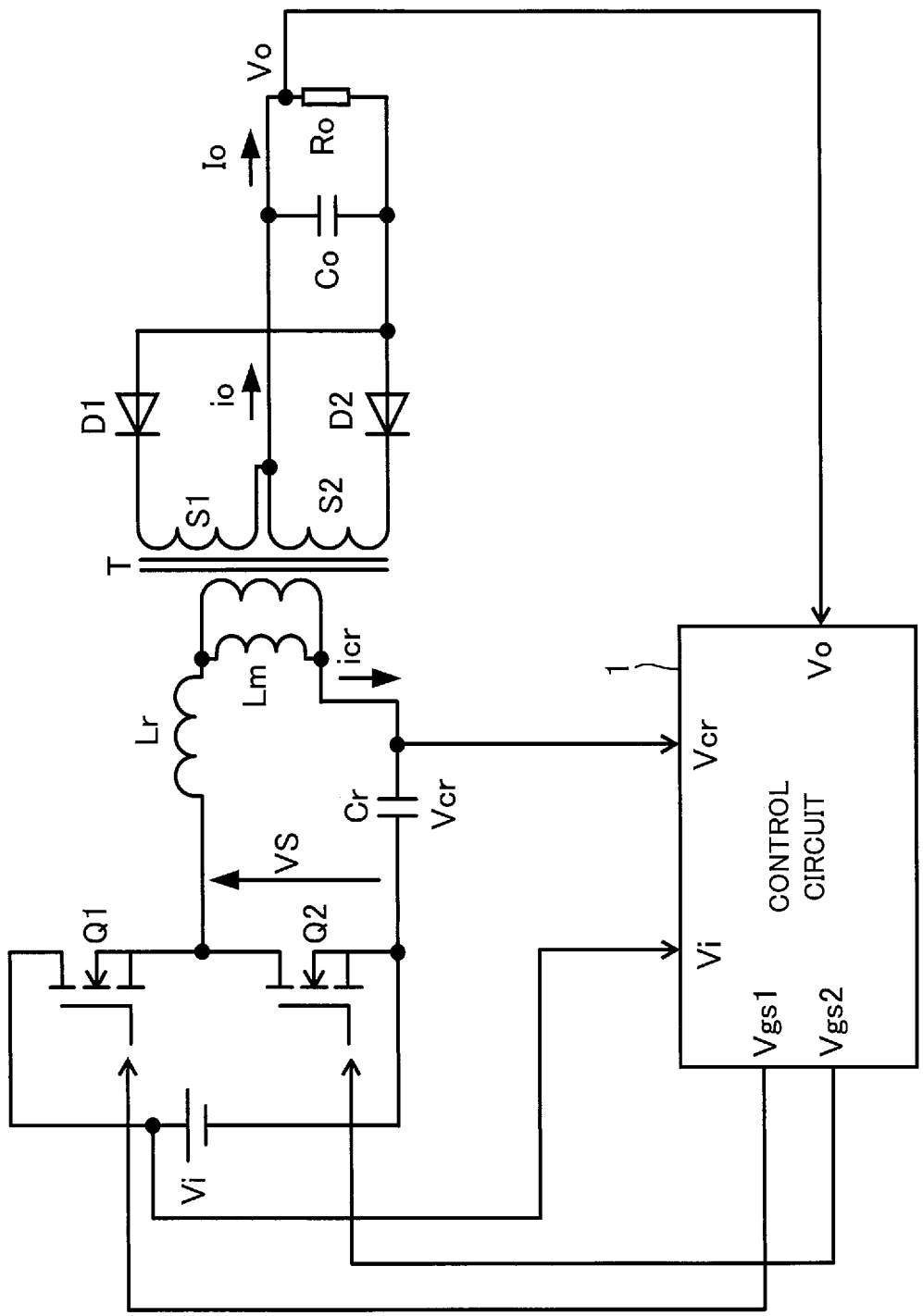
FIG. 1 illustrates an example of the structure of a resonance converter to which the present disclosure is applied.
Figure 2:
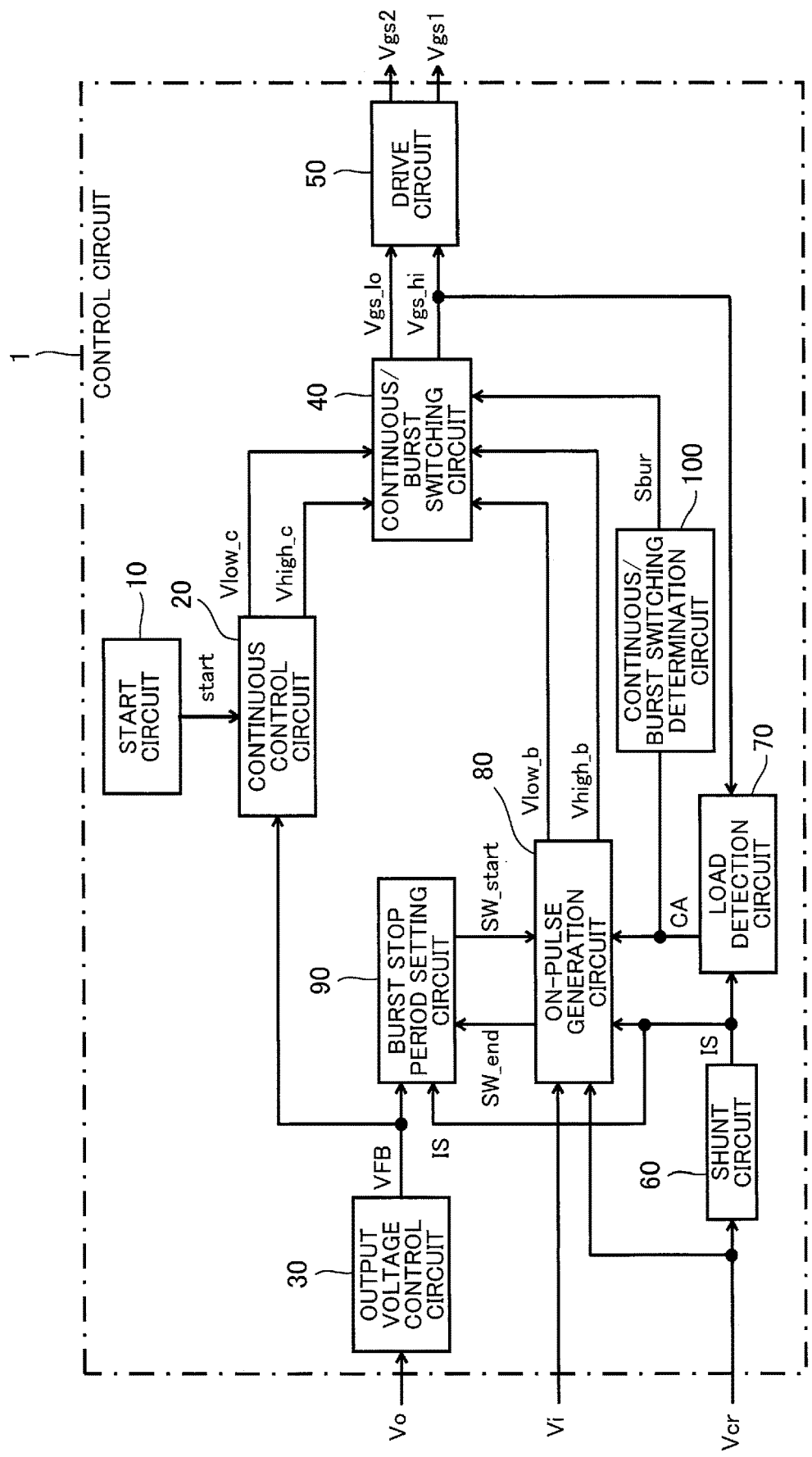
FIG. 2 is a block diagram illustrative of an example of the structure of a control circuit.
Figure 4A:
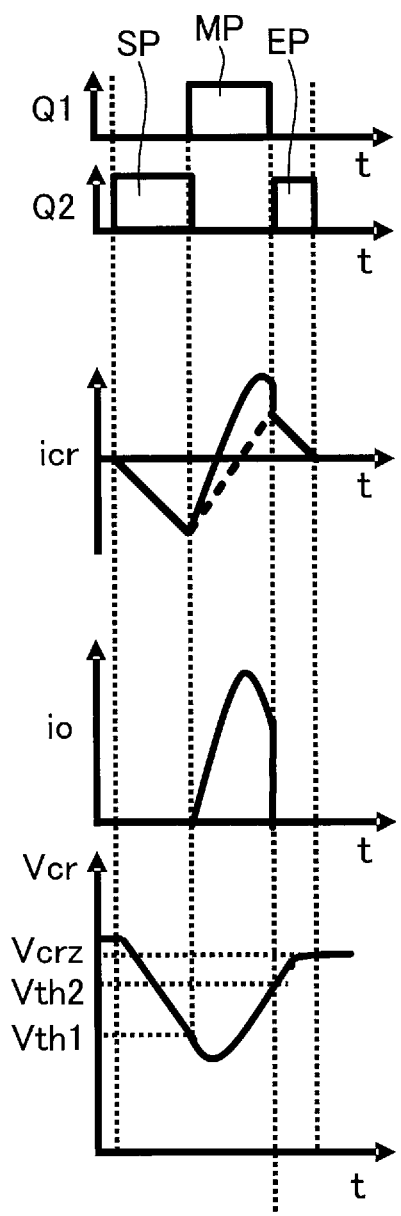
FIGS. 4A and 4B are views for describing an on-pulse generation state, FIG. 4A illustrating an on-pulse generation state at heavy load time in the burst control, FIG. 4B illustrating an on-pulse generation state at light load time in the burst control.
Figure 4B:
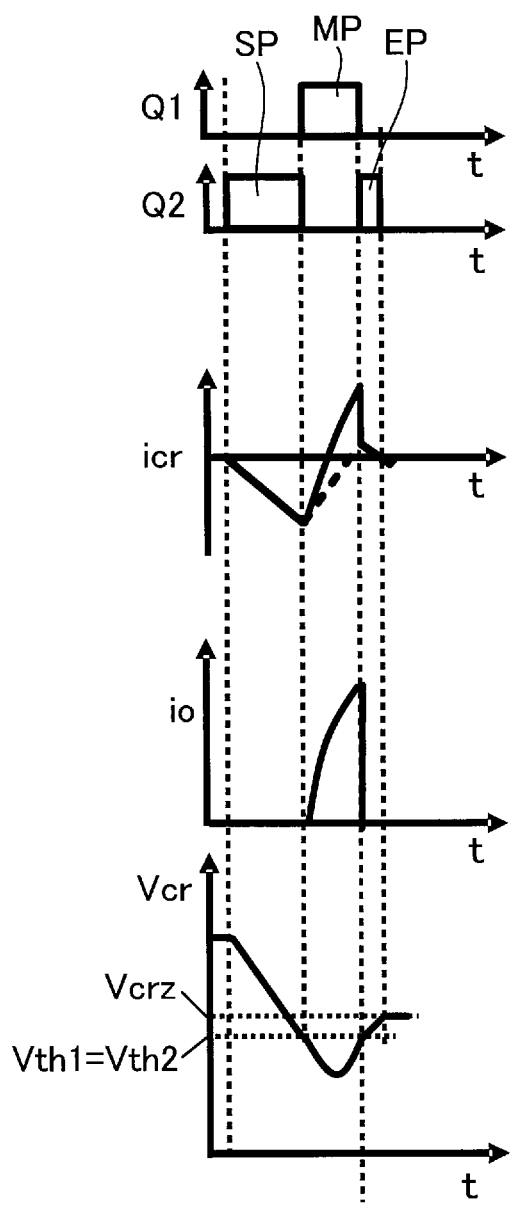

FIG. 1 illustrates an example of the structure of a resonance converter to which the present disclosure is applied. FIG. 2 is a block diagram illustrative of an example of the structure of a control circuit. FIGS. 3A and 3B illustrate a change in burst cycle. FIG. 3A illustrates a state in which a load is heavy in burst control. FIG. 3B illustrates a state in which the load is light in the burst control. FIGS. 4A and 4B are views for describing an on-pulse generation state. FIG. 4A illustrates an on-pulse generation state at heavy load time in the burst control. FIG. 4B illustrates an on-pulse generation state at light load time in the burst control. FIGS. 3A and 3B illustrate an on-pulse of a switching element Q1, an on-pulse of a switching element Q2, and a secondary-side current io in that order from the top. FIGS. 4A and 4B illustrate an on-pulse of the switching element Q1, an on-pulse of the switching element Q2, a resonant current icr, a secondary-side current io, and a voltage Vcr across a resonance capacitor Cr in that order from the top. A dashed line drawn in a waveform indicative of the resonant current icr represents an excitation current which does not contribute to a load current.

Figure 16:
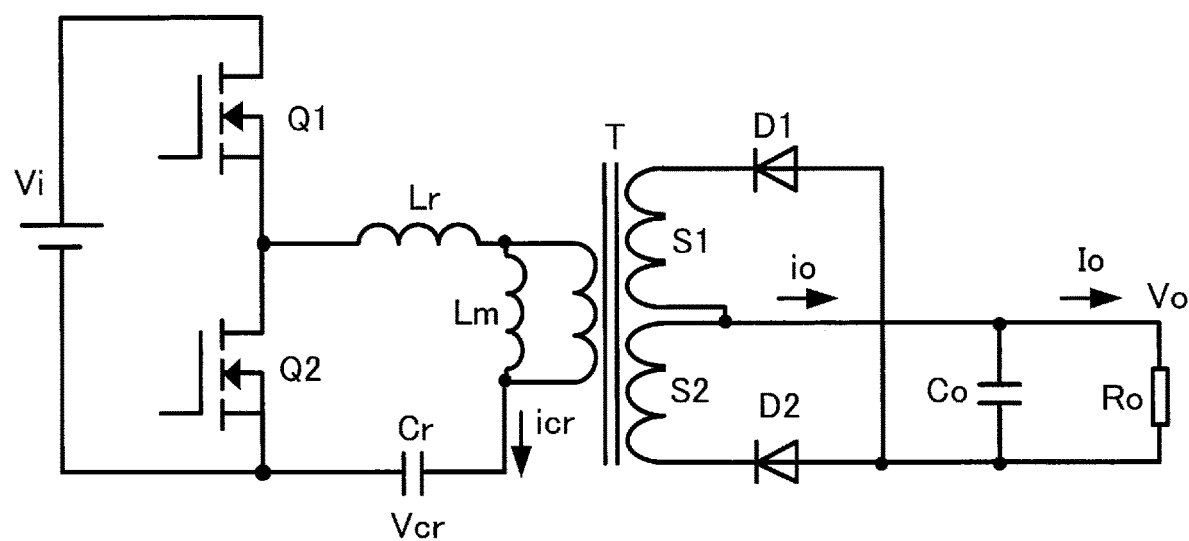
FIG. 16 illustrates an example of the fundamental structure of a resonance converter.
Figure 17:
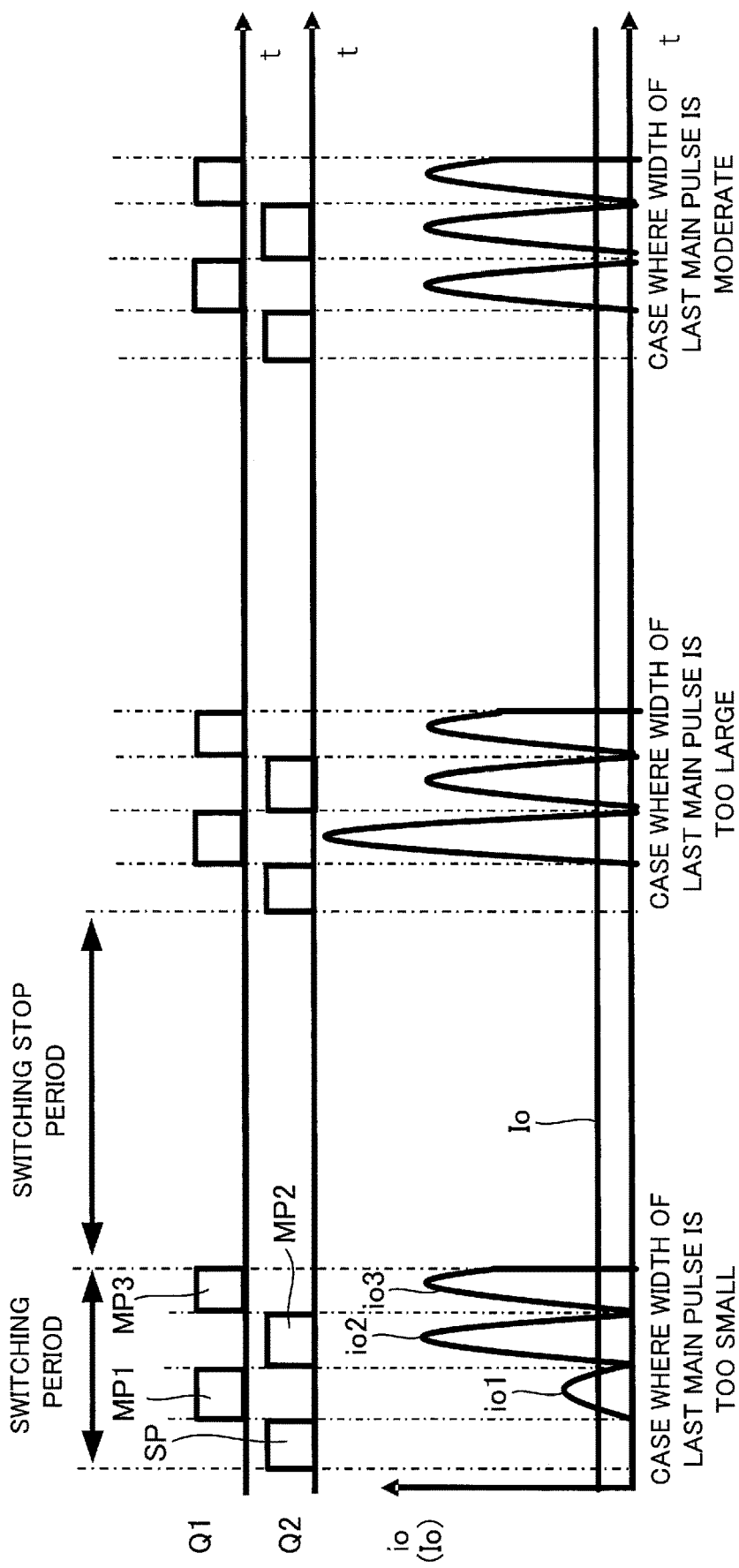
FIG. 17 illustrates a change in current flowing during a switching period.

The fundamental structure of a resonance converter is the same as the structure of the resonance converter illustrated in FIG. 16. That is to say, the resonance converter includes a half-bridge circuit, a series resonance circuit, and an output circuit. Furthermore, the resonance converter includes a control circuit 1 which controls the operation of the resonance converter. The control circuit 1 has the function of a burst controller.

The half-bridge circuit includes the high-side switching element Q1 and the low-side switching element Q2 connected in series and converts a direct-current input voltage Vi to a rectangular-wave pulse. The series resonance circuit includes a resonance inductor Lr, an excitation inductor Lm of a transformer T, and the resonance capacitor Cr. The resonance inductor Lr, the excitation inductor Lm of the transformer T, and the resonance capacitor Cr are connected in series to make up a current resonant current. The output circuit includes diodes D1 and D2 connected to secondary windings S1 and S2, respectively, of the transformer T and an output capacitor Co, rectifies and smooths power transmitted to the secondary side of the transformer T, and outputs a direct-current output voltage Vo. The output voltage Vo of the output circuit is supplied to a load Ro.

The control circuit 1 has a Vgs1 terminal and a Vgs2 terminal from which gate signals Vgs1 and Vgs2 for on-off controlling the switching elements Q1 and Q2, respectively, are outputted, a Vi terminal at which the input voltage Vi is received, a Vcr terminal at which a voltage Vcr across the resonance capacitor Cr is received, and a Vo terminal at which the output voltage Vo is received.

As illustrated in FIG. 2, the control circuit includes a start circuit 10. An output of the start circuit 10 is connected to a continuous control circuit 20 to supply a start signal start. The continuous control circuit 20 is connected to an output of an output voltage control circuit 30 to input a feedback signal VFB to the continuous control circuit 20. An input of the output voltage control circuit 30 is connected to the Vo terminal and the output voltage Vo is inputted to the output voltage control circuit 30. An output of the continuous control circuit 20 is connected to an input of a continuous/burst switching circuit 40 to supply a high-side signal Vhigh_c and a low-side signal Vlow_c for continuous control. An output of the continuous/burst switching circuit 40 is connected to an input of a drive circuit 50 to supply a high-side signal Vgs_hi and a low-side signal Vgs_lo. The drive circuit 50 is connected to gates of the switching elements Q1 and Q2 to supply gate signals Vgs1 and Vgs2 thereto.

Furthermore, the control circuit 1 includes a shunt circuit 60, a load detection circuit 70, an on-pulse generation circuit 80, a burst stop period setting circuit 90, and a continuous/burst switching determination circuit 100 used mainly at burst control time.

An input of the shunt circuit 60 is connected to the connection point of the excitation inductor Lm and the resonance capacitor Cr. An output of the shunt circuit 60 is connected to an input of the load detection circuit 70, an input of the on-pulse generation circuit 80, and an input of the burst stop period setting circuit 90. The shunt circuit 60 outputs a current detection signal IS which is a voltage signal proportional to the resonant current icr flowing into the resonance capacitor Cr. The load detection circuit 70 is connected to the output of the shunt circuit 60 and a high-side output of the continuous/burst switching circuit 40 and receives the current detection signal IS and the high-side signal Vgs_hi. An output of the load detection circuit 70 is connected to the on-pulse generation circuit 80 and the continuous/burst switching determination circuit 100. The load detection circuit 70 outputs a load detection signal CA indicative of the magnitude of a load. The on-pulse generation circuit 80 is connected to the Vi terminal and the Vcr terminal to receive voltages Vi and Vcr. Furthermore, the on-pulse generation circuit 80 is connected to the output of the shunt circuit 60 and the output of the load detection circuit 70 to receive the current detection signal IS and the load detection signal CA. In addition, the on-pulse generation circuit 80 is connected to an output of the burst stop period setting circuit 90 to receive a signal (on-trigger signal) SW_start. Moreover, the on-pulse generation circuit 80 is connected to the input of the continuous/burst switching circuit 40 to supply a high-side signal Vhigh_b and a low-side signal Vlow_b for burst control. The burst stop period setting circuit 90 is connected to the output of the output voltage control circuit 30 to receive the feedback signal VFB, is connected to the output of the shunt circuit 60 to receive the current detection signal IS, and is connected to an output of the on-pulse generation circuit 80 to receive a signal SW_end. The continuous/burst switching determination circuit 100 is connected to the output of the load detection circuit 70 to receive the load detection signal CA. An output of the continuous/burst switching determination circuit 100 is connected to the continuous/burst switching circuit 40 to output a signal Sbur.

When the resonance converter having the above structure is started, the control circuit 1 operates and the start circuit 10 outputs a start signal start after determined time. As a result, the continuous control circuit 20 begins continuous control and outputs signals Vhigh_c and Vlow_c. At this time the load detection circuit 70 detects a heavy load at start time and outputs a load detection signal CA indicative of the heavy load. The continuous/burst switching determination circuit 100 receives the load detection signal CA and outputs a low-level signal Sbur indicative of continuous control. Accordingly, the continuous/burst switching circuit 40 selects the signals Vhigh_c and Vlow_c outputted from the continuous control circuit 20 and outputs them as signals Vgs_hi and Vgs_lo. The drive circuit 50 receives the signals Vgs_hi and Vgs_lo, amplifies them, supplies gate signals Vgs1 and Vgs2 to the gates of the switching elements Q1 and Q2, respectively, and on-off controls the switching elements Q1 and Q2.

As a result, the series resonance circuit performs resonance operation, energy (power) is transmitted from the primary side to the secondary side of the transformer T, an output voltage Vo is outputted from the output circuit, and the output voltage Vo is supplied to the load Ro. The output voltage Vo is fed back to the control circuit 1 and the output voltage control circuit 30 of the control circuit 1 outputs a feedback signal VFB. The continuous control circuit 20 receives the feedback signal VFB, controls a switching frequency of the signals Vhigh_c and Vlow_c, and exercises control so as to make the output voltage Vo a target voltage.

The load Ro becomes lighter and the load detection circuit 70 outputs the load detection signal CA whose value corresponds to the magnitude of the load Ro. When the value of the load detection signal CA becomes smaller than a first CA threshold, the continuous/burst switching determination circuit 100 outputs a high-level signal Sbur indicative of burst control. The continuous/burst switching circuit 40 which receives the signal Sbur switches signals to be selected from the signals Vhigh_c and Vlow_c to signals Vhigh_b and Vlow_b.

At this time the on-pulse generation circuit 80 generates on-pulses during a switching period Tsw in a burst cycle and stops generating an on-pulse during a switching stop period Tst in the burst cycle. That is to say, as illustrated in FIG. 3A, the on-pulse generation circuit 80 generates three on-pulses or a start pulse SP, a main pulse MP, and an end pulse EP during the switching period Tsw in the burst cycle.

When the on-pulse generation circuit 80 receives a signal SW_start from the burst stop period setting circuit 90, the start pulse SP is put into an on state. As illustrated in FIG. 4A, when a voltage Vcr across the resonance capacitor Cr falls to a first off-threshold voltage Vth1, the start pulse SP is put into an off state. After that dead time is adjusted, then the main pulse MP is put into an on state. When a voltage Vcr across the resonance capacitor Cr rises to a second off-threshold voltage Vth2 (>Vth1), the main pulse MP is put into an off state. The second off-threshold voltage Vth2 is set to a value lower than a residual voltage Vcrz of the resonance capacitor Cr at the time of an end pulse EP being put into an off state in the preceding burst cycle. While the main pulse MP is in the on state, a secondary-side current io flows on the secondary side of the transformer T. After that dead time is adjusted, then the end pulse EP is put into an on state. The end pulse EP is put into an off state at the timing at which the sign of a resonant current icr is inverted.

When the load Ro becomes still lighter in the burst control and the value of the load detection signal CA outputted from the load detection circuit 70 reaches a second load threshold lower than a first load threshold, control is exercised so as to further reduce energy transmitted from the primary side to the secondary side of the transformer T. The second load threshold is set to a value higher than a threshold at the time of the burst cycle reaching a cycle (50 μs) corresponding to the upper limit (20 kHz) of the audible frequencies.

When the value of the load detection signal CA reaches the second load threshold, the on-width of the main pulse MP is narrowed. The on-width of the main pulse MP illustrated in FIG. 3B (second on-width) is narrower than the on-width of the main pulse MP illustrated in FIG. 3A (first on-width). As a result, the secondary-side current io is reduced and a load current Io is reduced.

In this embodiment, as illustrated in FIG. 4B, the second off-threshold voltage Vth2 is made equal to the first off-threshold voltage Vth1 as a means to narrow the on-width of the main pulse MP. By doing so, the timing at which the voltage Vcr across the resonance capacitor Cr reaches the second off-threshold voltage Vth2 after reaching the first off-threshold voltage Vth1 is made earlier and the timing at which the main pulse MP is put into an off state is made earlier. The on-width of the main pulse MP is narrowed. Therefore, as is clear from the difference in waveform between the secondary-side currents io, energy transmitted from the primary side to the secondary side of the transformer T while the main pulse MP is in an on state is reduced. If the on-width of the main pulse MP remains large, the switching stop period Tst gradually becomes longer because energy consumed by the load Ro reduces. As a result, the burst cycle may extend into the audible frequency band. On the other hand, if the on-width of the main pulse MP is narrowed, then the switching stop period Tst does not become longer. As a result, the burst cycle does not become longer. Therefore, the burst cycle does not extend into the audible frequency band.

A concrete example of each component included in the control circuit 1 will now be described.

Figure 5:
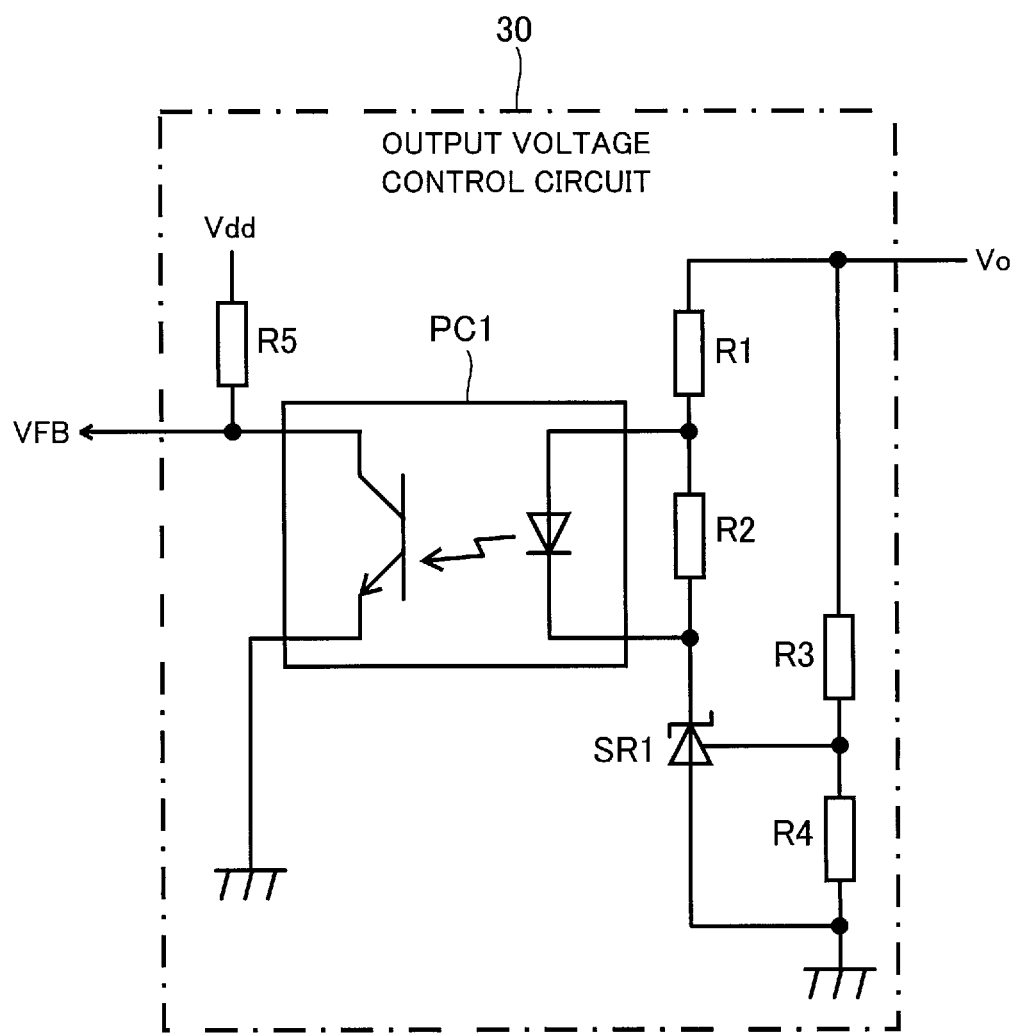
FIG. 5 is a circuit diagram illustrative of an example of the structure of an output voltage control circuit.

FIG. 5 is a circuit diagram illustrative of an example of the structure of the output voltage control circuit.

The output voltage control circuit 30 has a Vo terminal from which an output voltage Vo is inputted. The Vo terminal is connected to one terminal of a resistor R1 and the other terminal of the resistor R1 is connected to one terminal of a resistor R2 and an anode terminal of a light-emitting diode of a photocoupler PC1. The other terminal of the resistor R2 and a cathode terminal of the light-emitting diode are connected and are connected to a cathode terminal of a shunt regulator SR1. An anode terminal of the shunt regulator SR1 is connected to ground. The shunt regulator SR1 has a reference terminal connected to the connection point of resistors R3 and R4 connected in series between the Vo terminal and the ground.

A collector terminal of a phototransistor of the photocoupler PC1 is connected to a VFB terminal of the output voltage control circuit 30 and an emitter terminal of the phototransistor is connected to the ground. Furthermore, the collector terminal of the phototransistor is connected via a resistor R5 to a power source Vdd (not illustrated) of the control circuit 1.

With this output voltage control circuit 30 the shunt regulator SR1 passes to the light-emitting diode a current corresponding to an error between a voltage obtained by dividing the output voltage Vo by the resistors R3 and R4 and an internal reference voltage corresponding to a target voltage. Therefore, a current corresponding to the output voltage Vo flows through the light-emitting diode. As a result, as the output voltage Vo becomes higher, the light-emitting diode emits a larger amount of light. A current corresponding to the amount of light emitted by the light-emitting diode flows through the phototransistor which receives the light emitted by the light-emitting diode. Therefore, as the output voltage Vo becomes higher, a voltage at the collector terminal becomes lower. This voltage becomes a feedback signal VFB. The feedback signal VFB is supplied to the continuous control circuit 20 and the burst stop period setting circuit 90.

Figure 6:
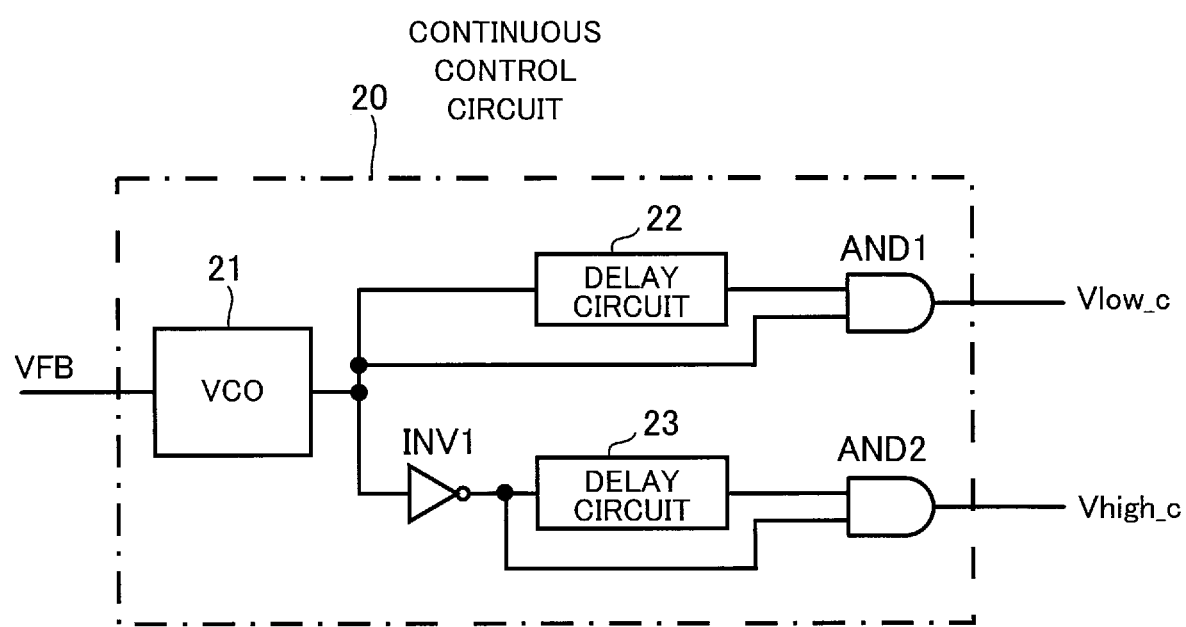
FIG. 6 is a circuit diagram illustrative of an example of the structure of a continuous control circuit.
Figure 7:
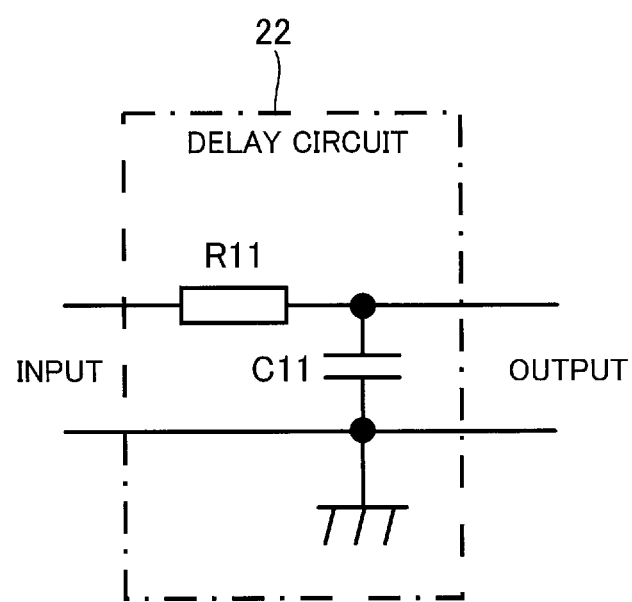
FIG. 7 is a circuit diagram illustrative of an example of the structure of a delay circuit.

FIG. 6 is a circuit diagram illustrative of an example of the structure of the continuous control circuit. FIG. 7 is a circuit diagram illustrative of an example of the structure of a delay circuit.

As illustrated in FIG. 6, the continuous control circuit 20 has a VFB terminal. The VFB terminal is connected to an input of a voltage controlled oscillator (VCO) 21. An output of the voltage controlled oscillator 21 is connected to an input of a delay circuit 22 and one input of an AND circuit AND1. An output of the delay circuit 22 is connected to the other input of the AND circuit AND1 and an output of the AND circuit AND1 is connected to a Vlow_c terminal. A low-side signal Vlow_c used for continuous control is outputted from the Vlow_c terminal.

Furthermore, the output of the voltage controlled oscillator 21 is connected to an input of an inverter circuit INV1 and an output of the inverter circuit INV1 is connected to an input of a delay circuit 23 and one input of an AND circuit AND2. An output of the delay circuit 23 is connected to the other input of the AND circuit AND2 and an output of the AND circuit AND2 is connected to a Vhigh_c terminal. A high-side signal Vhigh_c used for the continuous control is outputted from the Vhigh_c terminal.

The circuit structure of the delay circuit 22 is the same as that of the delay circuit 23. Therefore, FIG. 7 illustrates the circuit structure of the delay circuit 22 on behalf of them. The delay circuit 22 includes a resistor R11 and a capacitor C11. One terminal of the resistor R11 is connected to an input terminal of the delay circuit 22 and the other terminal of the resistor R11 is connected to an output terminal of the delay circuit 22 and one terminal of the capacitor C11. The other terminal of the capacitor C11 is connected to the ground.

When a feedback signal VFB from the output voltage control circuit 30 is inputted to this continuous control circuit 20, the voltage controlled oscillator 21 outputs a pulse signal having an oscillation frequency corresponding to the feedback signal VFB. This pulse signal is converted by the delay circuit 22 and the AND circuit AND1 to a signal whose rising timing is delayed. This signal is outputted as a signal Vlow_c. Similarly, the pulse signal outputted by the voltage controlled oscillator 21 is level-inverted by the inverter circuit INV1 and is converted by the delay circuit 23 and the AND circuit AND2 to a signal whose rising timing is delayed. This signal is outputted as a signal Vhigh_c. Delay time caused by the delay circuits 22 and 23 corresponds to dead time during which both of the switching elements Q1 and Q2 are turned off at the same time to prevent a through current from flowing through the switching elements Q1 and Q2.

Figure 8:
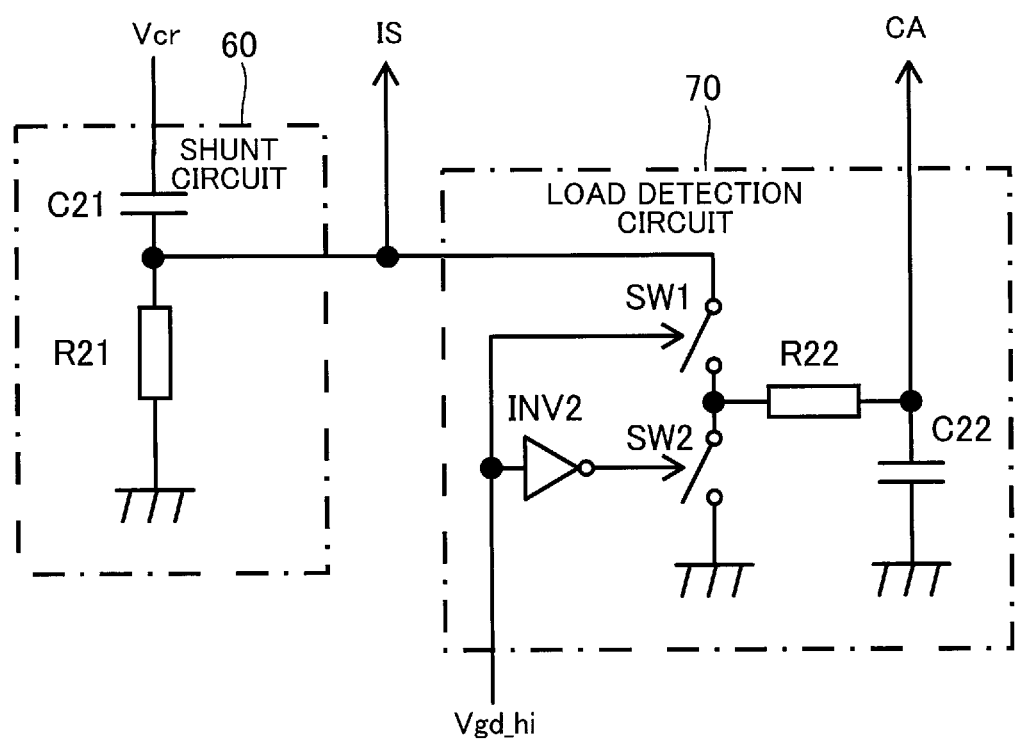
FIG. 8 is a circuit diagram illustrative of an example of the structure of each of a shunt circuit and a load detection circuit.

FIG. 8 is a circuit diagram illustrative of an example of the structure of each of the shunt circuit and the load detection circuit.

The shunt circuit 60 has a Vcr terminal. One terminal of a capacitor C21 is connected to the Vcr terminal and the other terminal of the capacitor C21 is connected to one terminal of a resistor R21. The other terminal of the resistor R21 is connected to the ground.

A circuit including the capacitor C21 and the resistor R21 connected in series is connected in parallel with the resonance capacitor Cr and a resonant current icr is shunted to the circuit. A current flowing to this circuit is converted by the resistor R21 to a voltage and is outputted as a current detection signal IS from the shunt circuit 60.

The load detection circuit 70 has an IS terminal, a Vgd_hi terminal, and a CA terminal. The IS terminal is connected to one terminal of a switch SW1, the other terminal of the switch SW1 is connected to one terminal of a switch SW2, and the other terminal of the switch SW2 is connected to the ground. The Vgd_hi terminal is connected to a control terminal of the switch SW1 and an input of an inverter circuit INV2. An output of the inverter circuit INV2 is connected to a control terminal of the switch SW2. The common connection point of the switches SW1 and SW2 is connected to one terminal of a resistor R22 and the other terminal of the resistor R22 is connected to the CA terminal and one terminal of a capacitor C22. The other terminal of the capacitor C22 is connected to the ground.

When the high-side switching element Q1 is turned on, a signal Vgd_hi outputted from the continuous/burst switching circuit 40 becomes a high level and an input voltage Vi is supplied to the series resonance circuit. Because a high-level signal Vgd_hi is inputted, the switch SW1 is closed and the switch SW2 is opened. At this time the current detection signal IS of the resonant current icr is charged via the switch SW1 and the resistor R22 in the capacitor C22. Conversely, when the high-side switching element Q1 is turned off, the signal Vgd_hi becomes a low level. As a result, the switch SW1 is opened and the switch SW2 is closed. Accordingly, electric charges stored in the capacitor C22 are discharged via the resistor R22 to the ground.

As stated above, the current detection signal IS caused by a current supplied from the input voltage Vi is charged in the capacitor C22 only during a period during which the switching element Q1 is in an on state. A ground-level signal which indicates that the current detection signal IS is zero is applied to the capacitor C22 during a period during which the switching element Q1 is in an off state. The current detection signal IS obtained only during the period during which the switching element Q1 is in the on state is averaged by the capacitor C22 and is outputted as a load detection signal CA from the CA terminal. The load detection signal CA indicates the average value of a current inputted via the switching element Q1 to the resonance converter and accurately represents the load state of the resonance converter. Therefore, the load detection signal CA is used by the on-pulse generation circuit 80 and the continuous/burst switching determination circuit 100 for switching control operation on the basis of the magnitude of a load.

Figure 9:
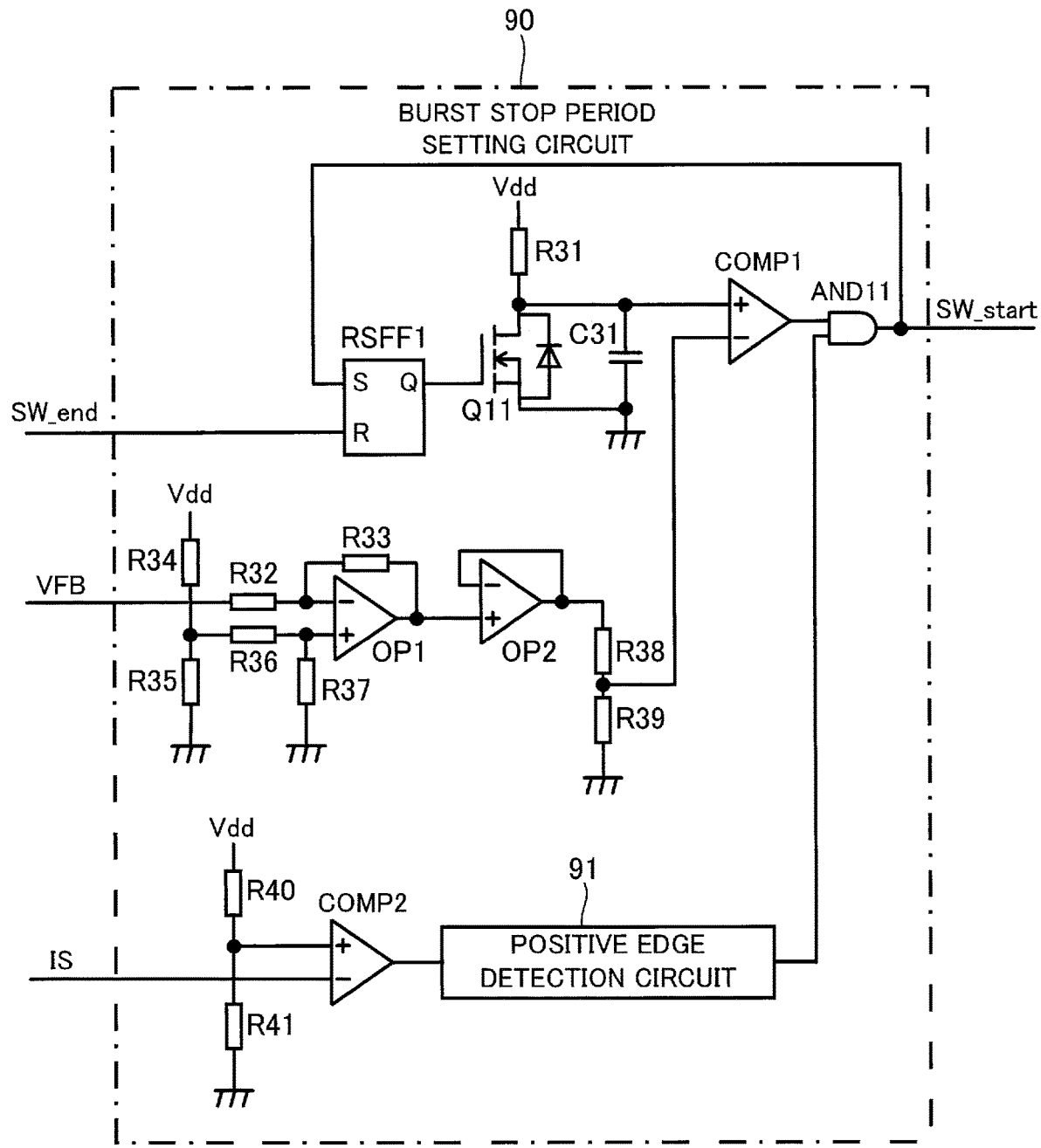
FIG. 9 is a circuit diagram illustrative of an example of the structure of a burst stop time setting circuit.
Figure 10:
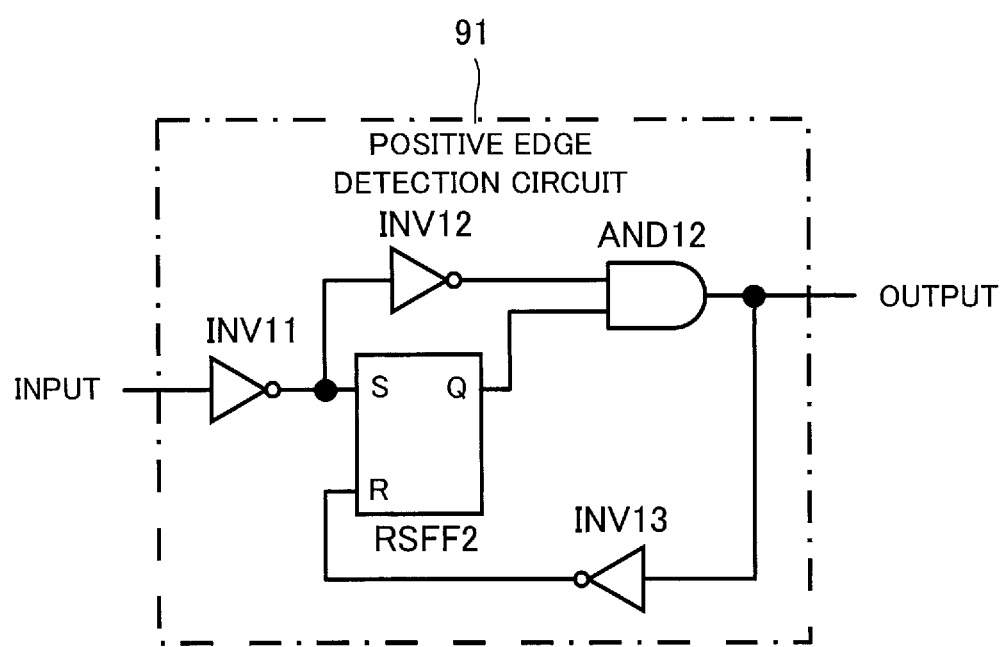
FIG. 10 is a circuit diagram illustrative of an example of the structure of a positive edge detection circuit.

FIG. 9 is a circuit diagram illustrative of an example of the structure of a burst stop period setting circuit. FIG. 10 is a circuit diagram illustrative of an example of the structure of a positive edge detection circuit.

The burst stop period setting circuit 90 has a VFB terminal which receives a feedback signal VFB from the output voltage control circuit 30, an IS terminal which receives a current detection signal IS from the shunt circuit 60, and an SW_end terminal which receives a signal SW_end from the on-pulse generation circuit 80. Furthermore, the burst stop period setting circuit 90 has a SW_start terminal from which a signal SW_start is outputted to the on-pulse generation circuit 80.

The SW_end terminal is connected to a reset input terminal of an RS flip-flop RSFF1 and the SW_start terminal is connected to a set input terminal of the RS flip-flop RSFF1. An output terminal of the RS flip-flop RSFF1 is connected to a gate terminal of a switching element Q11. A drain terminal of the switching element Q11 is connected via a resistor R31 to the power source Vdd and a source terminal of the switching element Q11 is connected to the ground. A diode connected in inverse parallel with the switching element Q11 is a body diode of the switching element Q11. Furthermore, the drain terminal of the switching element Q11 is connected to one terminal of a capacitor C31 and a non-inverting input terminal of a comparator COMP1. The other terminal of the capacitor C31 is connected to the ground. An output terminal of the comparator COMP1 is connected to one input of an AND circuit AND11 and an output of the AND circuit AND11 is connected to the SW_start terminal.

The VFB terminal is connected to one terminal of a resistor R32 and the other terminal of the resistor R32 is connected to an inverting input terminal of an operational amplifier OP1 and one terminal of a resistor R33. The other terminal of the resistor R33 is connected to an output terminal of the operational amplifier OP1. A reference voltage circuit including resistors R34, R35, R36, and R37 is connected to a non-inverting input terminal of the operational amplifier OP1. That is to say, one terminal of the resistor R34 is connected to the power source Vdd and the other terminal of the resistor R34 is connected to one terminal of the resistor R35. The other terminal of the resistor R35 is connected to the ground. The common connection point of the resistors R34 and R35 is connected to one terminal of the resistor R36 and the other terminal of the resistor R36 is connected to the non-inverting input terminal of the operational amplifier OP1 and one terminal of the resistor R37. The other terminal of the resistor R37 is connected to the ground.

The resistors R32 and R36 have the same resistance value and the resistors R33 and R37 have the same resistance value. Accordingly, the operational amplifier OP1 is a subtractor which amplifies the difference between the voltage of the feedback signal VFB and a voltage obtained by dividing the voltage of the power source Vdd by the resistors R34 and R35 (operational amplifier OP1 may be considered as an inverting amplifier for the voltage of the feedback signal VFB, considering that the voltage of the power source Vdd is fixed). By adopting this structure, as the voltage of the feedback signal VFB becomes higher, an output voltage of the operational amplifier OP1 becomes lower.

The output terminal of the operational amplifier OP1 is connected to a non-inverting input terminal of an operational amplifier OP2. An inverting input terminal and an output terminal of the operational amplifier OP2 is connected to form a voltage follower circuit. The output terminal of the operational amplifier OP2 is connected to one terminal of a resistor R38 and the other terminal of the resistor R38 is connected to one terminal of a resistor R39. The other terminal of the resistor R39 is connected to the ground. The common connection point of the resistors R38 and R39 is connected to an inverting input terminal of the comparator COMP1.

The IS terminal is connected to an inverting input terminal of a comparator COMP2. One terminal of a resistor R40 is connected to the power source Vdd and the other terminal of the resistor R40 is connected to one terminal of a resistor R41. The other terminal of the resistor R41 is connected to the ground. The common connection point of the resistors R40 and R41 is connected to a non-inverting input terminal of the comparator COMP2. An output terminal of the comparator COMP2 is connected to an input of a positive edge detection circuit 91. An output of the positive edge detection circuit 91 is connected to the other input of the AND circuit AND11.

A circuit from the IS terminal to the other input of the AND circuit AND11 detects, for making the switching elements Q1 and Q2 perform zero-current switching, that a current detection signal IS obtained by converting a resonant current icr to a voltage falls to a value close to 0 volt.

As illustrated in FIG. 10, the positive edge detection circuit 91 includes an inverter circuit INV11. An input of the inverter circuit INV11 is connected to an input of the positive edge detection circuit 91. An output of the inverter circuit INV11 is connected to a set input terminal of an RS flip-flop RSFF2 and an input of an inverter circuit INV12. An output of the inverter circuit INV12 is connected to one input of an AND circuit AND12. The other input of the AND circuit AND12 is connected to an output terminal of the RS flip-flop RSFF2. An output of the AND circuit AND12 is connected to an output of the positive edge detection circuit 91 and an input of an inverter circuit INV13. An output of the inverter circuit INV13 is connected to a reset input terminal of the RS flip-flop RSFF2.

When a signal SW_end which indicates that an end pulse EP is put into an off state is inputted first from the on-pulse generation circuit 80 to the above burst stop period setting circuit 90, the RS flip-flop RSFF1 is reset. As a result, the switching element Q11 is turned off. Because the switching element Q11 is turned off, a current is supplied via the resistor R31 from the power source Vdd to the capacitor C31, charging is begun, and a switching stop period Tst in a burst cycle begins. A voltage across the capacitor C31 is compared with a voltage based on a feedback signal VFB by the comparator COMP1. When the voltage across the capacitor C31 exceeds the voltage based on the feedback signal VFB, the comparator COMP1 outputs a high-level signal.

As a load becomes lighter, a current supplied from the converter becomes more than a current consumed by the load. As a result, an output voltage becomes rather high. When the output voltage becomes high, the voltage of the feedback signal VFB becomes low and an output voltage of the comparator COMP1 becomes high. Accordingly, as the load becomes lighter, time during which the capacitor C31 is charged lengthens.

The resonant current icr continues resonance operation even during the switching stop period Tst in the burst cycle. When the current detection signal IS obtained by converting the resonant current icr under resonance operation to a voltage falls to a value close to 0 volt and the fall in the resonant current icr is detected by the comparator COMP2, an output of the comparator COMP2 changes from a low level to a high level. When an output of the comparator COMP2 is at a low level, the RS flip-flop RSFF2 included in the positive edge detection circuit 91 is set and a high-level signal is applied to the other input of the AND circuit AND12. When the output of the comparator COMP2 changes to the high level, the high-level signal is changed by the inverter circuit INV11 to a low-level signal and is changed again by the inverter circuit INV12 to a high-level signal. As a result, the AND circuit AND12 outputs a high-level signal. Because the comparator COMP1 has already outputted the high-level signal, the AND circuit AND11 outputs a high-level signal at the timing at which the positive edge detection circuit 91 outputs the high-level signal. This high-level signal is an on-trigger signal SW_start which puts a start pulse SP into an on state. The switching stop period Tst in the burst cycle ends and a switching period Tsw in the next burst cycle begins, by this high-level signal. At this time the signal SW_start is inputted to the set input terminal of the RS flip-flop RSFF1 and turns on the switching element Q11. Because the switching element Q11 is turned on, electric charges stored in the capacitor C31 are discharged. The comparator COMP1 outputs a low-level signal. The AND circuit AND11 outputs a low-level signal until a signal SW_end is inputted.

When the input signal of the inverter circuit INV11 returns to a low level, the reset input terminal of the RS flip-flop RSFF2 becomes a high level via the inverter circuit INV11, the inverter circuit INV12, and the AND circuit AND12. As a result, the RS flip-flop RSFF2 is reset.

Figure 11:
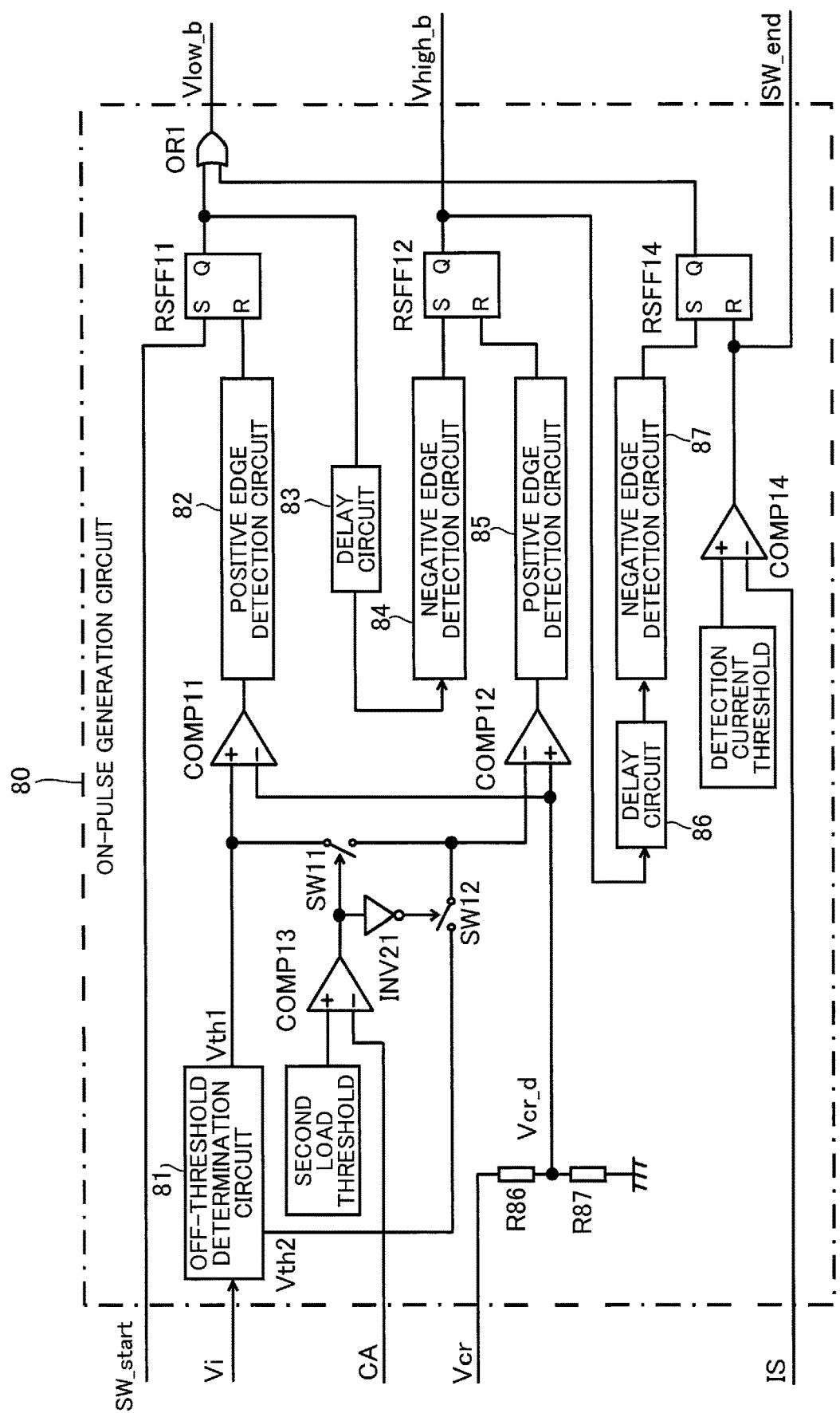
FIG. 11 is a circuit diagram illustrative of an example of the structure of an on-pulse generation circuit.
Figure 12:
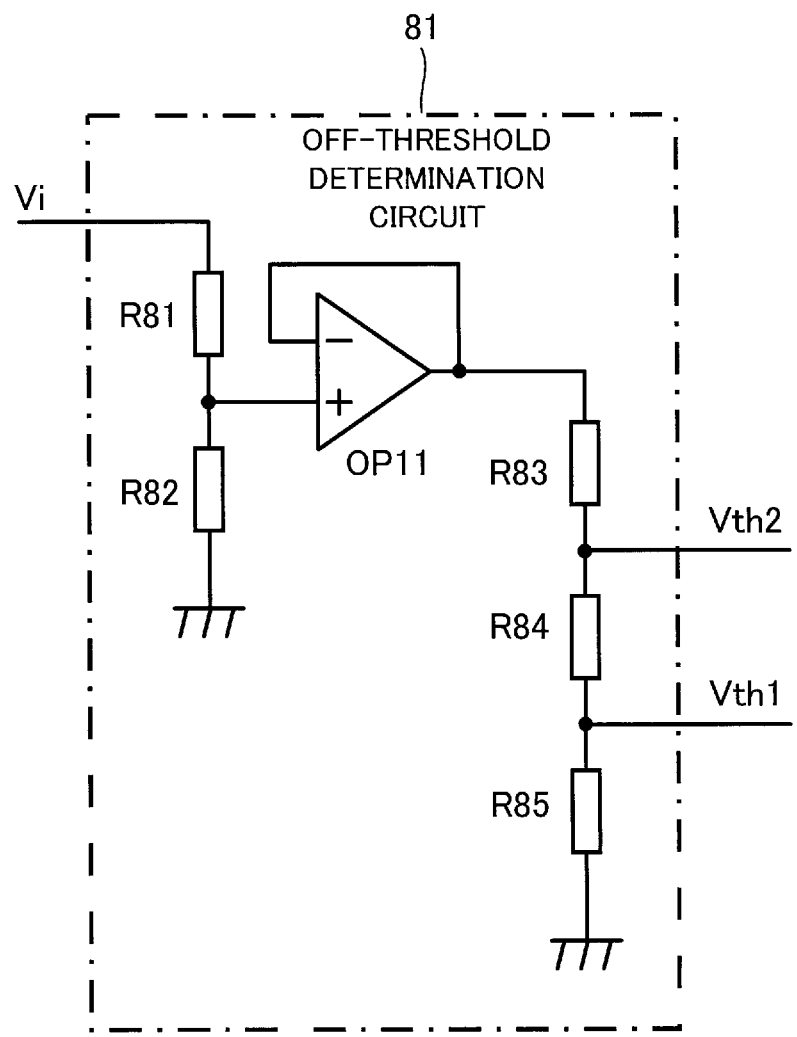
FIG. 12 is a circuit diagram illustrative of an example of the structure of an off-threshold determination circuit.
Figure 13:
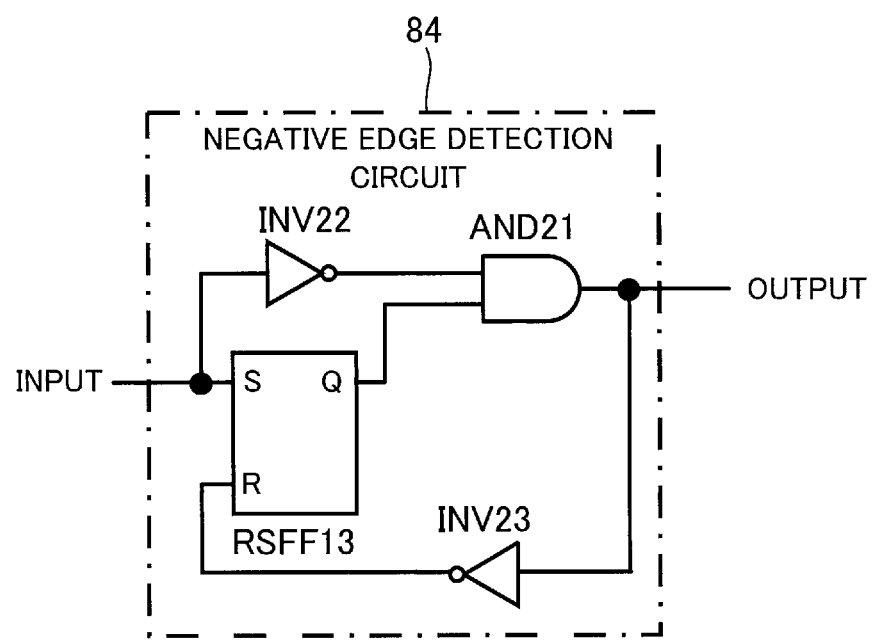
FIG. 13 is a circuit diagram illustrative of an example of the structure of a negative edge detection circuit.

FIG. 11 is a circuit diagram illustrative of an example of the structure of the on-pulse generation circuit. FIG. 12 is a circuit diagram illustrative of an example of the structure of an off-threshold determination circuit. FIG. 13 is a circuit diagram illustrative of an example of the structure of a negative edge detection circuit.

As illustrated in FIG. 11, the on-pulse generation circuit 80 has an SW_start terminal, a Vi terminal, a CA terminal, a Vcr terminal, and an IS terminal as input terminals and has a Vlow_b terminal, a Vhigh_b terminal, and an SW_end terminal as output terminals.

The SW_start terminal is connected to a set input terminal of an RS flip-flop RSFF11 and an output terminal of the RS flip-flop RSFF11 is connected to one input of an OR circuit OR1. An output of the OR circuit OR1 is connected to the Vlow_b terminal.

The Vi terminal is connected to an input of an off-threshold determination circuit 81. A first output (for a first off-threshold voltage Vth1) of an off-threshold determination circuit 81 is connected to a non-inverting input terminal of a comparator COMP11 and one terminal of a switch SW11. The other terminal of the switch SW11 is connected to an inverting input terminal of a comparator COMP12 and one terminal of a switch SW12. The other terminal of the switch SW12 is connected to a second output (for a second off-threshold voltage Vth2) of the off-threshold determination circuit 81.

With the off-threshold determination circuit 81, as illustrated in FIG. 12, a Vi terminal is connected to one terminal of a resistor R81 and the other terminal of the resistor R81 is connected to one terminal of a resistor R82. The other terminal of the resistor R82 is connected to the ground. The common connection point of the resistors R81 and R82 is connected to a non-inverting input terminal of an operational amplifier OP11. An inverting input terminal and an output terminal of the operational amplifier OP11 is connected to form a voltage follower circuit. The output terminal of the operational amplifier OP11 is connected to one terminal of a resistor R83 and the other terminal of the resistor R83 is connected to one terminal of a resistor R84. The other terminal of the resistor R84 is connected to one terminal of a resistor R85. The other terminal of the resistor R85 is connected to the ground. The common connection point of the resistors R84 and R85 is the first output of the off-threshold determination circuit 81 which outputs the first off-threshold voltage Vth1. The common connection point of the resistors R83 and R84 is the second output of the off-threshold determination circuit 81 which outputs the second off-threshold voltage Vth2. This creates the dependence of the first off-threshold voltage Vth1 and the second off-threshold voltage Vth2 at which a start pulse SP and a main pulse MP, respectively, are put into an off state on an input voltage Vi. It is assumed that the resistance values of the resistors R83, R84, and R85 are r83, r84, and r85 respectively. In this embodiment setting is performed so that r83=r84+r85.

The CA terminal of the on-pulse generation circuit 80 is connected to an inverting input terminal of a comparator COMP13 and a second load threshold is applied to a non-inverting input terminal of the comparator COMP13. An output terminal of the comparator COMP13 is connected to a control terminal of a switch SW11 and an input of an inverter circuit INV21. An output of the inverter circuit INV21 is connected to a control terminal of a switch SW12. The switches SW11 and SW12 and the inverter circuit INV21 make up a threshold voltage switcher.

An output terminal of the comparator COMP11 is connected to an input of a positive edge detection circuit 82 and an output of the positive edge detection circuit 82 is connected to a reset input terminal of the RS flip-flop RSFF11. The output terminal of the RS flip-flop RSFF11 is also connected to an input of a delay circuit 83 and an output of the delay circuit 83 is connected to an input of a negative edge detection circuit 84. An output of the negative edge detection circuit 84 is connected to a set input terminal of an RS flip-flop RSFF12. An output terminal of the comparator COMP12 is connected to an input of a positive edge detection circuit 85 and an output of the positive edge detection circuit 85 is connected to a reset input terminal of the RS flip-flop RSFF12. An output terminal of the RS flip-flop RSFF12 is connected to the Vhigh_b terminal. The concrete structure of the positive edge detection circuits 82 and 85 is the same as the structure of the positive edge detection circuit 91 illustrated in FIG. 10. The concrete structure of the delay circuit 83 is the same as the structure of the delay circuit 22 illustrated in FIG. 7.

As illustrated in FIG. 13, the negative edge detection circuit 84 includes an RS flip-flop RSFF13. A set input terminal of the RS flip-flop RSFF13 is connected to an input of the negative edge detection circuit 84 and an input of an inverter circuit INV22. An output of the inverter circuit INV22 is connected to one input of an AND circuit AND21 and the other input of the AND circuit AND21 is connected to an output terminal of the RS flip-flop RSFF13. An output of the AND circuit AND21 is connected to an output of the negative edge detection circuit 84 and an input of an inverter circuit INV23. An output of the inverter circuit INV23 is connected to a reset input terminal of the RS flip-flop RSFF13. The negative edge detection circuit 84 differs from the positive edge detection circuit 91 illustrated in FIG. 10 only in that it does not include the inverter circuit INV11. Accordingly, a response to an input is the same as the response of the positive edge detection circuit 91 obtained by inverting an input signal and inputting an obtained signal.

The Vcr terminal of the on-pulse generation circuit 80 is connected to one terminal of a resistor R86 and the other terminal of the resistor R86 is connected to one terminal of a resistor R87. The other terminal of the resistor R87 is connected to the ground. The common connection point of the resistors R86 and R87 is connected to an inverting input terminal of the comparator COMP11 and a non-inverting input terminal of the comparator COMP12. It is assumed that the resistance values of the resistors R86 and R87 are r86 and r87 respectively and that the resistance values of the resistors R81 and R82 included in the off-threshold determination circuit 81 are r81 and r82 respectively. In this embodiment setting is performed so that r81/r82=r86/r87.

The output terminal of the RS flip-flop RSFF12 is also connected to an input of a delay circuit 86 and an output of the delay circuit 86 is connected to an input of a negative edge detection circuit 87. An output of the negative edge detection circuit 87 is connected to a set input terminal of an RS flip-flop RSFF14. The circuit structure of the negative edge detection circuit 87 is the same as that of the negative edge detection circuit 84 illustrated in FIG. 13.

The IS terminal of the on-pulse generation circuit 80 is connected to an inverting input terminal of a comparator COMP14 and a detection current threshold is applied to a non-inverting input terminal of the comparator COMP14. The detection current threshold determines an off-trigger of an end pulse EP and has a value (approximately equal to 0 volt) close to a ground level at which the sign of a resonant current icr is inverted. An output terminal of the comparator COMP14 is connected to a reset input terminal of the RS flip-flop RSFF14 and the SW_end terminal of the on-pulse generation circuit 80.

The load Ro becomes lighter and a burst cycle has begun. A signal CA indicative of a load value larger than the second load threshold is inputted to the CA terminal of the on-pulse generation circuit 80. At this time the comparator COMP13 outputs a low-level signal. As a result, the switch SW11 is opened and the switch SW12 is closed. Accordingly, the first off-threshold voltage Vth1 is applied to the non-inverting input terminal of the comparator COMP11 and the second off-threshold voltage Vth2 is applied to the inverting input terminal of the comparator COMP12.

When the on-pulse generation circuit 80 receives at the SW_start terminal a high-level signal SW_start from the burst stop period setting circuit 90 at the end of a switching stop period Tst in the burst cycle, the RS flip-flop RSFF11 is set and a high-level signal is outputted from the output terminal of the RS flip-flop RSFF11. This high-level signal is outputted via the OR circuit OR1 from the Vlow_b terminal as a signal Vlow_b. The signal Vlow_b outputted at this time is used as a start pulse SP for turning on the low-side switching element Q2.

When the low-side switching element Q2 is turned on by the start pulse SP, a voltage Vcr across the resonance capacitor Cr falls. When the value of a signal Vcr_d obtained by dividing the voltage Vcr by the resistors R86 and R87 reaches the first off-threshold voltage Vth1, a high-level signal is outputted to the output terminal of the comparator COMP11. The rising timing of this high-level signal is detected by the positive edge detection circuit 82 and the RS flip-flop RSFF11 is reset. As a result, a low-level signal is outputted from the output terminal of the RS flip-flop RSFF11, the signal Vlow_b becomes the low level, and the start pulse SP ends. This low-level output signal of the RS flip-flop RSFF11 is inputted via the delay circuit 83 to the negative edge detection circuit 84 and sets the RS flip-flop RSFF12 after the elapse of determined delay time. As a result, a high-level signal is outputted from the output terminal of the RS flip-flop RSFF12. This high-level signal is outputted as a signal Vhigh_b from the Vhigh_b terminal. The signal Vhigh_b outputted at this time is used as a main pulse MP for turning on the high-side switching element Q1.

When the high-side switching element Q1 is turned on by the main pulse MP, the resonant current icr increases in the positive direction. When the resonant current icr is inverted from a negative to a positive, the voltage Vcr across the resonance capacitor Cr rises. When the value of the signal Vcr_d obtained by dividing the voltage Vcr by the resistors R86 and R87 reaches the second off-threshold voltage Vth2, a high-level signal is outputted to the output terminal of the comparator COMP12. The rising timing of this high-level signal is detected by the positive edge detection circuit 85 and the RS flip-flop RSFF12 is reset. As a result, a low-level signal is outputted from the output terminal of the RS flip-flop RSFF12, the signal Vhigh_b becomes the low level, and the main pulse MP ends. The low-level output signal of the RS flip-flop RSFF12 is inputted via the delay circuit 86 to the negative edge detection circuit 87 and sets the RS flip-flop RSFF14 after the elapse of determined delay time. As a result, a high-level signal is outputted from the output terminal of the RS flip-flop RSFF14. This high-level signal is outputted via the OR circuit OR1 from the Vlow_b terminal as the signal Vlow_b. The signal Vlow_b outputted at this time is used as an end pulse EP for turning on the low-side switching element Q2.

After that, when the resonant current icr decreases and a current detection signal IS reaches the detection current threshold, the comparator COMP14 outputs a high-level signal. As a result, the RS flip-flop RSFF14 is reset and the low-side switching element Q2 is turned off. At this time, the end pulse EP ends, a switching period Tsw in a burst cycle ends, and a signal SW_end is outputted from the SW_end terminal to the burst stop period setting circuit 90.

Next, when the load Ro becomes still lighter and the signal CA indicative of a load value becomes smaller than or equal to the second load threshold, the comparator COMP13 outputs a high-level signal. As a result, the switch SW11 is closed and the switch SW12 is opened. Accordingly, the first off-threshold voltage Vth1 is applied to the non-inverting input terminal of the comparator COMP11 and the inverting input terminal of the comparator COMP12. That is to say, as illustrated in FIG. 4B, the voltage Vcr across the resonance capacitor Cr is compared only with the first off-threshold voltage Vth1.

When the on-pulse generation circuit 80 receives a high-level signal SW_start at the SW_start terminal from the burst stop period setting circuit 90, the RS flip-flop RSFF11 is set and a high-level signal is outputted from the output terminal of the RS flip-flop RSFF11. This high-level signal is outputted via the OR circuit OR1 from the Vlow_b terminal as a signal Vlow_b and a start pulse SP begins.

When the low-side switching element Q2 is turned on by the signal Vlow_b, the voltage Vcr across the resonance capacitor Cr falls. When the value of a signal Vcr_d obtained by dividing the voltage Vcr by the resistors R86 and R87 reaches the first off-threshold voltage Vth1, a high-level signal is outputted to the output terminal of the comparator COMP11. The rising timing of this high-level signal is detected by the positive edge detection circuit 82 and the RS flip-flop RSFF11 is reset. As a result, a low-level signal is outputted from the output terminal of the RS flip-flop RSFF11, the signal Vlow_b also becomes the low level, the low-side switching element Q2 is turned off, and the start pulse SP ends. This low-level output signal of the RS flip-flop RSFF11 is inputted via the delay circuit 83 to the negative edge detection circuit 84 and sets the RS flip-flop RSFF12 after the elapse of the determined delay time. As a result, a high-level signal is outputted from the output terminal of the RS flip-flop RSFF12. This high-level signal is outputted as a signal Vhigh_b from the Vhigh_b terminal and a main pulse MP begins.

When the high-side switching element Q1 is turned on by the signal Vhigh_b, the resonant current icr increases in the positive direction. When the resonant current icr is inverted from a negative to a positive, the voltage Vcr across the resonance capacitor Cr rises. When the value of the signal Vcr_d obtained by dividing the voltage Vcr by the resistors R86 and R87 reaches the first off-threshold voltage Vth1, a high-level signal is outputted to the output terminal of the comparator COMP12. The rising timing of this high-level signal is detected by the positive edge detection circuit 85 and the RS flip-flop RSFF12 is reset. As a result, a low-level signal is outputted from the output terminal of the RS flip-flop RSFF12, the signal Vhigh_b becomes the low level, and the main pulse MP ends.

At this time a reference voltage of the comparator COMP12 is set to the first off-threshold voltage Vth1 lower than the second off-threshold voltage Vth2. Accordingly, the comparator COMP12 outputs the high-level signal earlier than a case where the reference voltage of the comparator COMP12 is set to the second off-threshold voltage Vth2. That is to say, the on-width of the main pulse MP is made smaller than a case where the reference voltage of the comparator COMP12 is set to the second off-threshold voltage Vth2. Accordingly, energy transmitted from the primary side to the secondary side of the transformer T is reduced further. In this embodiment the on-width of the main pulse MP is controlled only in one stage. However, even if an output voltage Vo fluctuates by controlling the on-width of the main pulse MP, the function of feedback control of the output voltage Vo practically prevents the output voltage Vo from deviating from a target voltage.

The low-level output signal of the RS flip-flop RSFF12 is inputted via the delay circuit 86 to the negative edge detection circuit 87 and sets the RS flip-flop RSFF14 after the elapse of the determined delay time. As a result, a high-level signal is outputted from the output terminal of the RS flip-flop RSFF14. This high-level signal is outputted via the OR circuit OR1 from the Vlow_b terminal as a signal Vlow_b and an end pulse EP begins.

After that, when the resonant current icr decreases and a current detection signal IS reaches the detection current threshold, the comparator COMP14 outputs a high-level signal. As a result, the RS flip-flop RSFF14 is reset and the low-side switching element Q2 is turned off. At this time, the end pulse EP ends, a switching period Tsw in a burst cycle ends, and a signal SW_end is outputted from the SW_end terminal to the burst stop period setting circuit 90.

Figure 14:
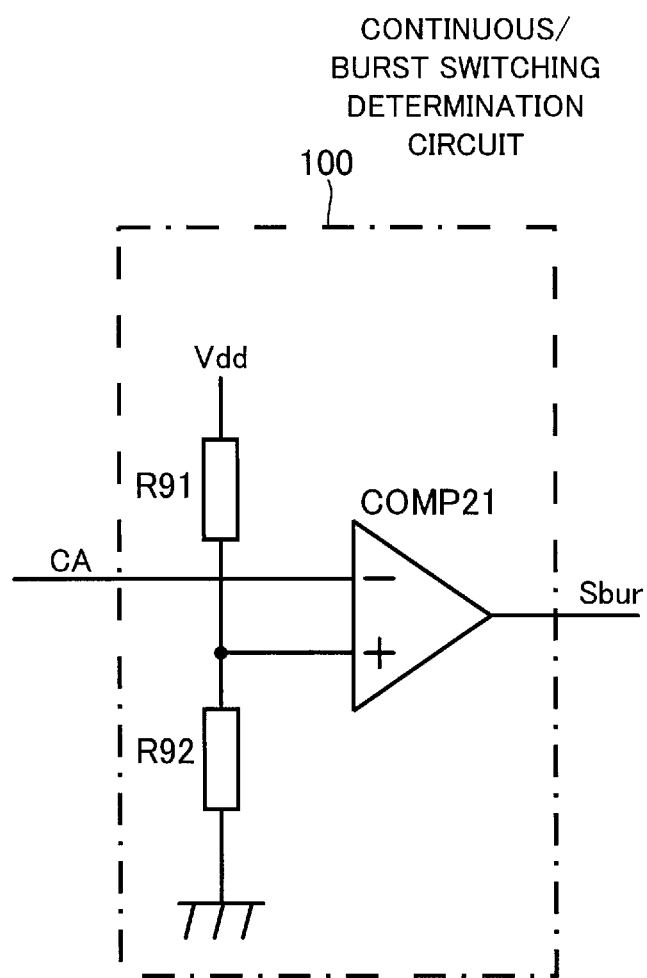
FIG. 14 is a circuit diagram illustrative of an example of the structure of a continuous/burst switching determination circuit.
Figure 15:
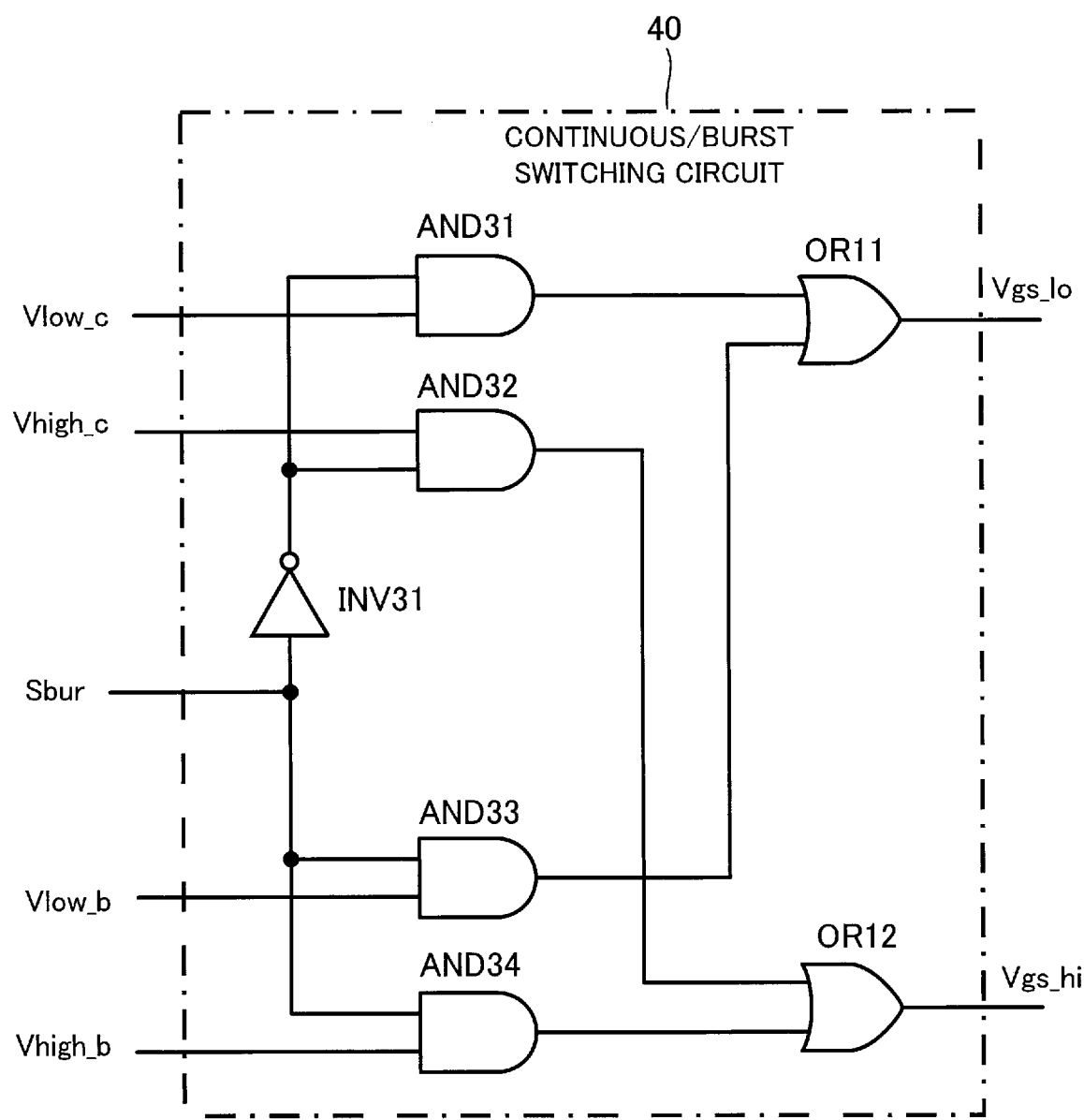
FIG. 15 is a circuit diagram illustrative of an example of the structure of a continuous/burst switching circuit.

FIG. 14 is a circuit diagram illustrative of an example of the structure of the continuous/burst switching determination circuit. FIG. 15 is a circuit diagram illustrative of an example of the structure of the continuous/burst switching circuit.

As illustrated in FIG. 14, the continuous/burst switching determination circuit 100 has a CA terminal as an input terminal and has an Sbur terminal as an output terminal. The CA terminal is connected to an inverting input terminal of a comparator COMP21 and an output terminal of the comparator COMP21 is connected to the Sbur terminal. Furthermore, the continuous/burst switching determination circuit 100 includes resistors R91 and R92. One terminal of the resistor R91 is connected to the power source Vdd and the other terminal of the resistor R91 is connected to a non-inverting input terminal of the comparator COMP21 and one terminal of the resistor R92. The other terminal of the resistor R92 is connected to the ground. The value of a voltage obtained by dividing the voltage of the power source Vdd by the resistors R91 and R92 corresponds to the first load threshold on the basis of which switching is performed between continuous control and burst control of the resonance converter.

As illustrated in FIG. 15, the continuous/burst switching circuit 40 has a Vlow_c terminal, a Vhigh_c terminal, a Vlow_b terminal, a Vhigh_b terminal, and an Sbur terminal as input terminals and has a Vgs_lo terminal and a Vgs_hi terminal as output terminals.

The Vlow_c terminal is connected to one input of an AND circuit AND31 and an output of the AND circuit AND31 is connected to one input of an OR circuit OR11. An output of the OR circuit OR11 is connected to the Vgs_lo terminal. The Vhigh_c terminal is connected to one input of an AND circuit AND32 and an output of the AND circuit AND32 is connected to one input of an OR circuit OR12. An output of the OR circuit OR12 is connected to the Vgs_hi terminal. The Vlow_b terminal is connected to one input of an AND circuit AND33 and an output of the AND circuit AND33 is connected to the other input of the OR circuit OR11. The Vhigh_b terminal is connected to one input of an AND circuit AND34 and an output of the AND circuit AND34 is connected to the other input of the OR circuit OR12.

The Sbur terminal is connected to an input of an inverter circuit INV31 and an output of the inverter circuit INV31 is connected to the other input of the AND circuit AND31 and the other input of the AND circuit AND32. Furthermore, the Sbur terminal is connected to the other input of the AND circuit AND33 and the other input of the AND circuit AND34.

When the voltage value of a signal CA indicative of a load value is larger than the first load threshold, the continuous/burst switching determination circuit 100 determines that the load Ro is heavy. The comparator COMP21 included in the continuous/burst switching determination circuit 100 outputs a low-level signal Sbur. At this time the inverter circuit INV31 included in the continuous/burst switching circuit 40 which receives the low-level signal Sbur logic-inverts the low-level signal Sbur to a high-level signal and applies it to the other input of the AND circuit AND31 and the other input of the AND circuit AND32. As a result, the AND circuits AND31 and AND32 select signals Vlow_c and Vhigh_c received at the Vlow_c and Vhigh_c terminals respectively. The signals Vlow_c and Vhigh_c are outputted as signals Vgs_lo and Vgs_hi from the OR circuits OR11 and OR12 respectively. Because at this time the low-level signal Sbur is applied to the other input of the AND circuit AND33 and the other input of the AND circuit AND34, signals Vlow_b and Vhigh_b received at the Vlow_b and Vhigh_b terminals are obstructed by the AND circuits AND33 and AND 34 respectively.

On the other hand, when the voltage value of the signal CA indicative of a load value becomes smaller than the first load threshold, the continuous/burst switching determination circuit 100 determines that the load Ro is light. The comparator COMP21 included in the continuous/burst switching determination circuit 100 outputs a high-level signal Sbur. At this time the inverter circuit INV31 included in the continuous/burst switching circuit 40 logic-inverts the high-level signal Sbur to a low-level signal and applies it to the other input of the AND circuit AND31 and the other input of the AND circuit AND32. As a result, the AND circuits AND31 and AND32 obstruct signals Vlow_c and Vhigh_c received at the Vlow_c and Vhigh_c terminals respectively. Because at this time the high-level signal Sbur is applied to the other input of the AND circuit AND33 and the other input of the AND circuit AND34, the AND circuits AND33 and AND 34 select signals Vlow_b and Vhigh_b received at the Vlow_b and Vhigh_b terminals respectively. The selected signals Vlow_b and Vhigh_b are outputted as signals Vgs_lo and Vgs_hi from the OR circuits OR11 and OR12 respectively.

The present disclosure has been described regarding the preferred embodiment. However, the present disclosure is not limited to this specific embodiment. In the above embodiment, for example, the on-width of the main pulse MP is controlled in one stage when the load Ro becomes very light in a burst control period. However, the on-width of the main pulse MP may be controlled in a plurality of stages.

With the burst controller and burst control method of the resonance converter having the above structure, only three pulses, that is to say, a start pulse, a main pulse, and an end pulse are generated during a switching period in a burst cycle and the switching period is short. Therefore, even if a switching stop period lengthens, the burst cycle hardly lengthens in essence. Furthermore, when a load becomes light, the on-width of the main pulse is made small. This reduces energy transmitted to the secondary side without lengthening the burst cycle.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A burst controller of a resonance converter, the resonance converter including a high-side switching element and a low-side switching element, and operating the high-side and low-side switching elements with a burst cycle having a burst frequency after a first time at which a load of the resonance converter becomes smaller than a first load threshold, the burst cycle including a switching period during which the high-side switching element and the low-side switching element are respectively and repeatedly turned on and off, and a switching stop period during which the high-side switching element and the low-side switching element are both turned off, the burst controller comprising:
    a load detection circuit which detects a magnitude of the load; and
    an on-pulse generation circuit which generates, during the switching period in the burst cycle,
    a start pulse that turns on the low-side switching element,
    a main pulse that turns on the high-side switching element, and
    an end pulse that turns on the low-side switching element, wherein
    the on-pulse generation circuit changes an on-width of the main pulse from a first on-width to a second on-width smaller than the first on-width at a second time obtained from the magnitude of the load detected by the load detection circuit, the second time being a time at which the load becomes smaller than a second load threshold smaller than the first load threshold.

2. The burst controller of the resonance converter according to claim 1, further comprising
    a burst stop period setting circuit which outputs, at a time of a sign of a resonant current of the resonance converter being inverted a determined time duration after the switching stop period starts and a predetermined period has passed, an on-trigger signal for ending the switching stop period in the burst cycle and starting the switching period in a next burst cycle.

3. The burst controller of the resonance converter according to claim 2, further comprising:
    an output voltage control circuit which feeds back a difference between an output voltage of the resonance converter and a target voltage to output a feedback signal for adjusting the output voltage;
    a continuous control circuit which generates a pulse signal having a frequency corresponding to a voltage of the feedback signal, and outputs a continuous control signal obtained from the pulse signal, the continuous control signal controlling to turn on and off the high-side switching element and the low-side switching element; and
    a continuous to burst switching circuit which switches, at the first time, the continuous control signal outputted from the continuous control circuit to the start pulse, the main pulse, and the end pulse generated by the on-pulse generation circuit.

4. The burst controller of the resonance converter according to claim 3, wherein the burst stop period setting circuit changes the predetermined period depending on the voltage of the feedback signal outputted by the output voltage control circuit.

5. The burst controller of the resonance converter according to claim 2, wherein the load detection circuit converts a current detection signal obtained by shunting the resonant current to a voltage signal, and averages the voltage signal to output a load detection signal indicating the magnitude of the load.

6. The burst controller of the resonance converter according to claim 5, wherein the on-pulse generation circuit includes:
    a first flip-flop which is set upon receiving the on-trigger signal from the burst stop period setting circuit, and outputs the start pulse;
    a first comparator which compares a voltage across a resonance capacitor through which the resonant current flows with a first off-threshold voltage, and which resets the first flip-flop at a time when the voltage across the resonance capacitor becomes lower than the first off-threshold voltage;
    a second flip-flop which is set by a reset operation of the first flip-flop, and which outputs the main pulse;
    a second comparator which compares the voltage across the resonance capacitor with a second off-threshold voltage higher than the first off-threshold voltage, and which resets the second flip-flop at a time when the voltage across the resonance capacitor becomes higher than the second off-threshold voltage;
    a third flip-flop which is set by a reset operation of the second flip-flop, and which outputs the end pulse;
    a third comparator which compares the current detection signal with a detection current threshold at which a sign of the current detection signal is inverted, and which resets the third flip-flop at a time when the current detection signal reaches the detection current threshold;

a fourth comparator which compares the load detection signal detected by the load detection circuit with the second load threshold to detect the second time; and a threshold voltage switcher which sets the second off-threshold voltage of the second comparator to the first off-threshold voltage at the second time detected by the fourth comparator.

7. The burst controller of the resonance converter according to claim 6, wherein the first off-threshold voltage and the second off-threshold voltage are generated by dividing an input voltage applied to a half-bridge circuit in which the high-side switching element and the low-side switching element are connected in series.

8. The burst controller according to claim 1, wherein the second load threshold is set larger than the magnitude of the load obtained when the burst frequency of the burst cycle is a maximum of audible frequencies.

9. A burst controller of a resonance converter, the resonance converter including a high-side switching element and a low-side switching element, and operating the high-side and low-side switching elements with a burst cycle having a burst frequency after a first time at which a load of the resonance converter becomes smaller than a first load threshold, the burst cycle including a switching period during which the high-side switching element and the low-side switching element are respectively and repeatedly turned on and off, and a switching stop period during which the high-side switching element and the low-side switching element are both turned off, the burst controller comprising:

a load detection circuit which detects a magnitude of the load; and an on-pulse generation circuit which generates, during the switching period in the burst cycle, a start pulse that turns on the low-side switching element, a main pulse that turns on the high-side switching element, and an end pulse that turns on the low-side switching element, a burst stop period setting circuit which outputs, at a time of a sign of a resonant current of the resonance converter being inverted a determined time duration after the switching stop period starts and a predetermined period has passed, an on-trigger signal for ending the switching stop period in the burst cycle and starting the switching period in a next burst cycle, wherein the on-pulse generation circuit changes an on-width of the main pulse from a first on-width to a second on-width smaller than the first on-width at a second time different from the first time, during the switching period in the burst cycle.

10. The burst controller of the resonance converter according to claim 9, wherein the magnitude of the load at the first time is greater than the magnitude of the load at the second time.

11. The burst controller of the resonance converter according to claim 10, wherein the second time is obtained from the magnitude of the load detected by the load detection circuit, the second time being a time at which the load becomes smaller than a second load threshold that is smaller than the first load threshold.

12. The burst controller of the resonance converter according to claim 9, further comprising:

an output voltage control circuit which feeds back a difference between an output voltage of the resonance converter and a target voltage to output a feedback signal for adjusting the output voltage;

a continuous control circuit which generates a pulse signal having a frequency corresponding to a voltage of the feedback signal, and outputs a continuous control signal obtained from the pulse signal, the continuous control signal controlling to turn on and off the high-side switching element and the low-side switching element; and a continuous to burst switching circuit which switches, at the first time, the continuous control signal outputted from the continuous control circuit to the start pulse, the main pulse, and the end pulse generated by the on-pulse generation circuit.

13. The burst controller of the resonance converter according to claim 12, wherein the burst stop period setting circuit changes the predetermined period depending on the voltage of the feedback signal outputted by the output voltage control circuit.

14. The burst controller of the resonance converter according to claim 9, wherein the load detection circuit converts a current detection signal obtained by shunting the resonant current to a voltage signal, and averages the voltage signal to output a load detection signal indicating the magnitude of the load.

15. A burst controller of a resonance converter, the resonance converter including a high-side switching element and a low-side switching element, and operating the high-side and low-side switching elements with a burst cycle having a burst frequency after a first time at which a load of the resonance converter becomes smaller than a first load threshold, the burst cycle including a switching period during which the high-side switching element and the low-side switching element are respectively and repeatedly turned on and off, and a switching stop period during which the high-side switching element and the low-side switching element are both turned off, the burst controller comprising:

a load detection circuit which detects a magnitude of the load; and an on-pulse generation circuit which operates the high-side and low-side switching elements either in a heavy load mode or a light load mode, based on a detection of the load detection circuit, the on-pulse generation circuit generating in the heavy load mode, during the switching period in the burst cycle after the first time a first start pulse that turns on the low-side switching element, a first main pulse that turns on the high-side switching element, and a first end pulse that turns on the low-side switching element, and generating in the light load mode, at a second time during the switching period in the burst cycle a second start pulse that turns on the low-side switching element, a second main pulse that turns on the high-side switching element, and a second end pulse that turns on the low-side switching element, a first width of the first main pulse being larger than a second width of the second main pulse.

16. The burst controller of the resonance converter according to the claim 15, wherein a width of the first start pulse generated in the heavy load mode is identical to a width of the second start pulse generated in the light load mode.

17. The burst controller of the resonance converter according to the claim 15, wherein the switching period in the heavy load mode is longer than the switching period in the light load mode.

18. The burst controller of the resonance converter according to the claim 15, wherein a ratio of the first width of the first main pulse to a third width of the first start pulse is greater than a ratio of the second width of the second main pulse to a fourth width of the second start pulse.

19. The burst controller of the resonance converter according to claim 15, wherein the magnitude of the load at the first time is greater than the magnitude of the load at the second time.

20. The burst controller of the resonance converter according to the claim 15, wherein the second time is obtained from the magnitude of the load detected by the load detection circuit, the second time being a time at which the load becomes smaller than a second load threshold that is smaller than the first load threshold.

21. The burst controller of the resonance converter according to the claim 15, wherein a ratio of a fifth width of the first end pulse to the third width of the first start pulse is greater than a ratio of a sixth width of the second end pulse to the fourth width of the second start pulse.

22. The burst controller of the resonance converter according to claim 15, further comprising
a burst stop period setting circuit which outputs, at a time of a sign of a resonant current of the resonance converter being inverted a determined time duration after the switching stop period starts and a predetermined period has passed, an on-trigger signal for ending the switching stop period in the burst cycle and starting the switching period in a next burst cycle.

23. The burst controller of the resonance converter according to claim 22, wherein the burst stop period setting circuit changes the predetermined period depending on the voltage of the feedback signal outputted by the output voltage control circuit.

24. The burst controller of the resonance converter according to claim 15, further comprising:
an output voltage control circuit which feeds back a difference between an output voltage of the resonance converter and a target voltage to output a feedback signal for adjusting the output voltage;
a continuous control circuit which generates a pulse signal having a frequency corresponding to a voltage of the feedback signal, and outputs a continuous control signal obtained from the pulse signal, the continuous control signal controlling to turn on and off the high-side switching element and the low-side switching element; and
a continuous to burst switching circuit which switches, at the first time, the continuous control signal outputted from the continuous control circuit to the start pulse, the main pulse, and the end pulse generated by the on-pulse generation circuit.

25. The burst controller of the resonance converter according to claim 15, wherein the load detection circuit converts a current detection signal obtained by shunting the resonant current to a voltage signal, and averages the voltage signal to output a load detection signal indicating the magnitude of the load.

* * * * *